US012109825B2

(12) United States Patent
Kobayashi et al.

(10) Patent No.: US 12,109,825 B2
(45) Date of Patent: Oct. 8, 2024

(54) HEAD UNIT AND LIQUID EJECTING APPARATUS

(71) Applicant: SEIKO EPSON CORPORATION, Tokyo (JP)

(72) Inventors: Haruki Kobayashi, Matsumoto (JP); Taiki Hanagami, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 160 days.

(21) Appl. No.: 17/979,798

(22) Filed: Nov. 3, 2022

(65) Prior Publication Data

US 2023/0134366 A1 May 4, 2023

(30) Foreign Application Priority Data

Nov. 4, 2021 (JP) ................................ 2021-180016

(51) Int. Cl.
*B41J 29/377* (2006.01)
*B41J 29/13* (2006.01)

(52) U.S. Cl.
CPC .............. *B41J 29/377* (2013.01); *B41J 29/13* (2013.01)

(58) Field of Classification Search
CPC . B41J 29/377; B41J 29/13; B41J 29/02; B41J 2/14
See application file for complete search history.

(56) References Cited

U.S. PATENT DOCUMENTS

2017/0225478 A1* 8/2017 Kimura ................ B41J 2/17506

FOREIGN PATENT DOCUMENTS

JP 2020-062763 A 4/2020
JP 2021-053882 A 4/2021

* cited by examiner

*Primary Examiner* — Thinh H Nguyen
(74) *Attorney, Agent, or Firm* — Harness, Dickey & Pierce, P.L.C.

(57) ABSTRACT

A head unit includes: a circuit substrate, a casing including a cover for defining an accommodation space that accommodates the circuit substrate, and a flow passage member of which a part is disposed in the casing, including a flow passage coupling portion. The cover has an intake port for sucking air from an outside of the cover to the accommodation space and an exhaust port for exhausting the air passing through the accommodation space, and the flow passage coupling portion is disposed outside the casing and disposed closer to the intake port than to the exhaust port.

15 Claims, 13 Drawing Sheets

HEAD UNIT AND LIQUID EJECTING APPARATUS

The present application is based on, and claims priority from JP Application Serial Number 2021-180016, filed Nov. 4, 2021, the disclosure of which is hereby incorporated by reference herein in its entirety.

BACKGROUND

1. Technical Field

The present disclosure relates to a head unit that ejects a liquid and a liquid ejecting apparatus, and more particularly, to a head unit that ejects ink as the liquid and an ink jet recording apparatus.

2. Related Art

A liquid ejecting apparatus represented by an ink jet recording apparatus, such as an ink jet printer or a plotter, includes a head unit capable of ejecting a liquid such as ink that is stored in an ink tank, an ink cartridge, or the like.

Disclosed is a configuration of a head unit including a cover constituting a casing, and a flow passage member and a wiring substrate accommodated in the casing, in which a supply protrusion and a discharge protrusion, which are flow passage coupling portions to which the external flow passage member is coupled, are disposed outside the cover (see, for example, JP-A-2021-53882).

Moreover, disclosed is a configuration in which an opening portion as an intake port of air and an opening portion as an exhaust port of the air are provided in the casing, and the air flows into the cover from the intake port to the exhaust port to cool a wiring member in the casing (see, for example, JP-A-2020-62763).

However, when a positional relationship between the intake port and the exhaust port formed in the casing and the flow passage coupling portion is not sufficiently considered, the flow passage coupling portion is heated by heat of a substrate or the air that flows in the casing and that has absorbed the heat of the substrate, thus heating the liquid flowing in the flow passage coupling portion, which results in a reduction of viscosity of the liquid. The liquid having the reduced viscosity is ejected from a nozzle, which may result in ejection defects such as deterioration in ejection characteristics.

SUMMARY

According to an aspect of the present disclosure, there is provided a head unit configured to eject a liquid, the head unit including: a circuit substrate for driving the head unit; a casing including a cover for defining an accommodation space that accommodates the circuit substrate; and a flow passage member of which a part is disposed in the casing, including a flow passage coupling portion for coupling with a flow passage member outside the head unit, in which the cover has an intake port for sucking air from an outside of the cover to the accommodation space and an exhaust port for exhausting the air passing through the accommodation space, and the flow passage coupling portion is disposed outside the casing and disposed closer to the intake port than to the exhaust port.

According to another aspect of the present disclosure, there is provided a liquid ejecting apparatus including: the head unit according to the above-described aspect; and a liquid storage portion storing the liquid supplied to the head unit.

DESCRIPTION OF EXEMPLARY EMBODIMENTS

Figure 1:
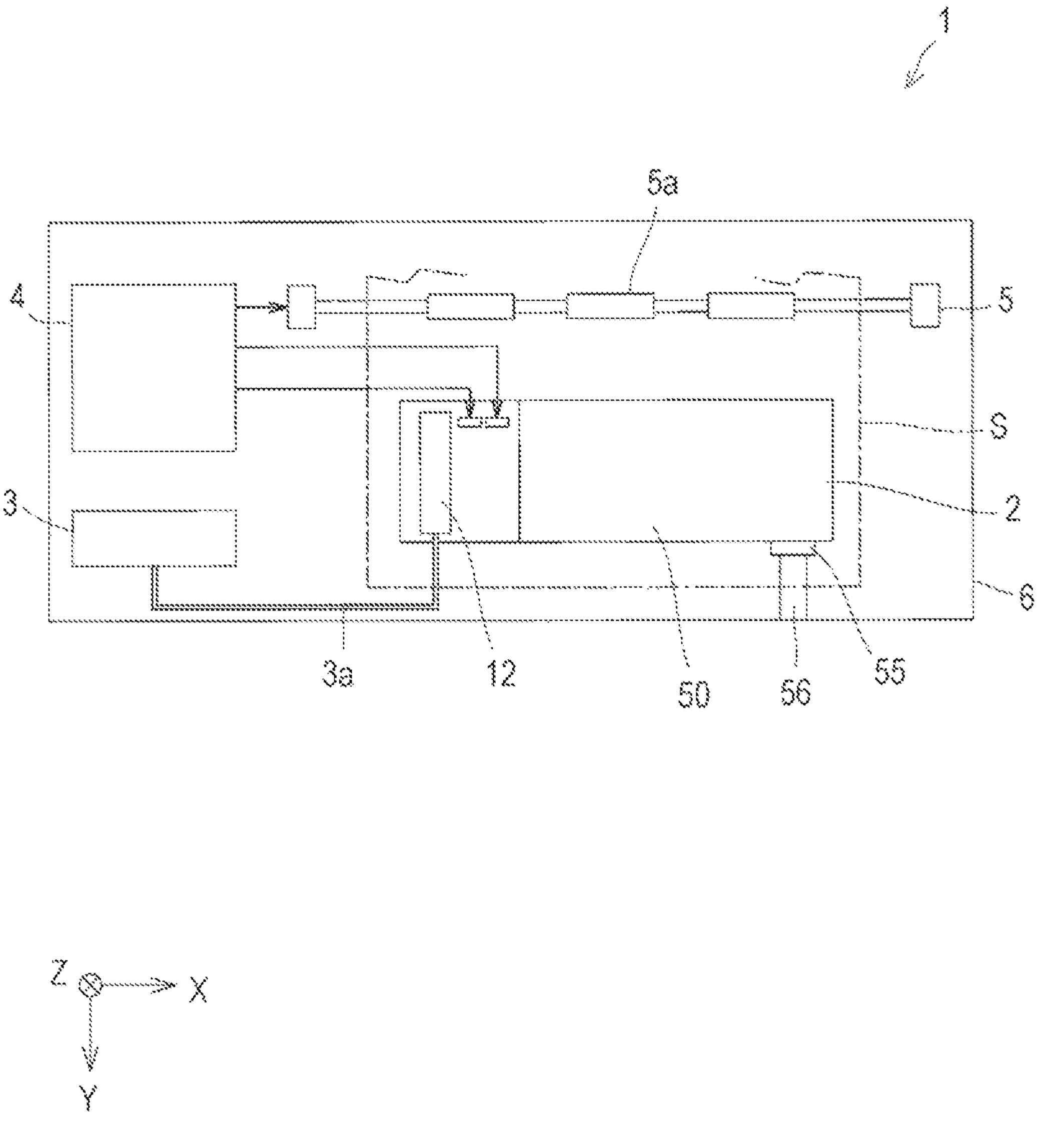
FIG. 1 is a plan view illustrating a schematic configuration of a recording apparatus according to a first embodiment.

Hereinafter, the present disclosure will be described based on embodiments. However, the following description shows an aspect of the present disclosure, and it is possible to make changes in an arbitrary manner within the scope of the present disclosure. In each drawing, members with the same reference numerals are the same members and description thereof will be appropriately omitted. In the drawings, X, Y, and Z represents three spatial axes orthogonal to one another. In the present specification, directions along these axes are defined as an X direction, a Y direction, and a Z direction, respectively. A direction of arrow in the drawings is described as a positive (+) direction, and a direction opposite to the arrow is described as a negative (−) direction. Further, the three spatial axes that do not limit the positive direction and the negative direction will be described as the X axis, the Y axis, and the Z axis, respectively.

First Embodiment

FIG. 1 is a plan view illustrating a schematic configuration of an ink jet recording apparatus 1, which is an example of a liquid ejecting apparatus, according to a first embodiment of the present disclosure. In the present embodiment, a +X direction is an example of a “first direction”, and a +Y direction is an example of a “second direction”.

An ink jet recording apparatus 1, which is an example of a "liquid ejecting apparatus" of the present embodiment is a printing apparatus that performs printing (as known as a recording operation) of an image or the like by ejecting and landing ink, which is a type of the liquid, onto a medium S for printing and arranging dots formed on the medium S. As the medium S, any material such as a resin film or cloth can be used in addition to a recording sheet. In addition, the ink jet recording apparatus 1 in the present embodiment is a so-called line recording apparatus that performs printing by ejecting and landing the ink onto the medium S from a head unit 2 while transporting the medium S, in a state in which the head unit 2 is fixed to an apparatus main body 6 during printing.

As illustrated in FIG. 1, the ink jet recording apparatus 1 includes the head unit 2, a liquid storage portion 3, a control unit 4, a transport mechanism 5, and the apparatus main body 6.

The head unit 2 has a nozzle for ejecting ink supplied from the liquid storage portion 3 toward the +Z direction. The head unit 2 is a so-called line head that ejects and lands the ink onto the medium S while transporting the medium S, in a state in which the head unit 2 is fixed to the apparatus main body 6 during printing. Details of the head unit 2 will be described later.

The liquid storage portion 3 separately stores a plurality of types of ink (for example, a plurality of colors) ejected from the head unit 2. The ink of the liquid storage portion 3 is supplied to the head unit 2 through the tube 3*a*. Examples of the liquid storage portion 3 include an ink cartridge that can be attached to and detached from the apparatus main body 6, a bag-like ink pack that is formed of a flexible film, and an ink tank that can be refilled with the ink. For example, the liquid storage portion 3 stores inks having a plurality of different colors or types.

The control unit 4 includes, for example, a control device such as a central processing unit (CPU) or a field programmable gate array (FPGA), and a storage device such as a semiconductor memory. The control unit 4 generally controls respective components of the ink jet recording apparatus 1, that is, the head unit 2, the transport mechanism 5, and the like by executing a program stored in the storage device by the control device.

The transport mechanism 5 has a transport roller 5*a* that is controlled by the control unit 4 and transports the medium S in a direction along the Y axis. That is, the transport mechanism 5 transports the medium S in the direction along the Y axis by rotation of the transport roller 5*a*. The transport mechanism 5 transporting the medium S is not limited to include the transport roller 5*a*, and may be a transport roller transporting the medium S by a belt or a drum.

Figure 2:
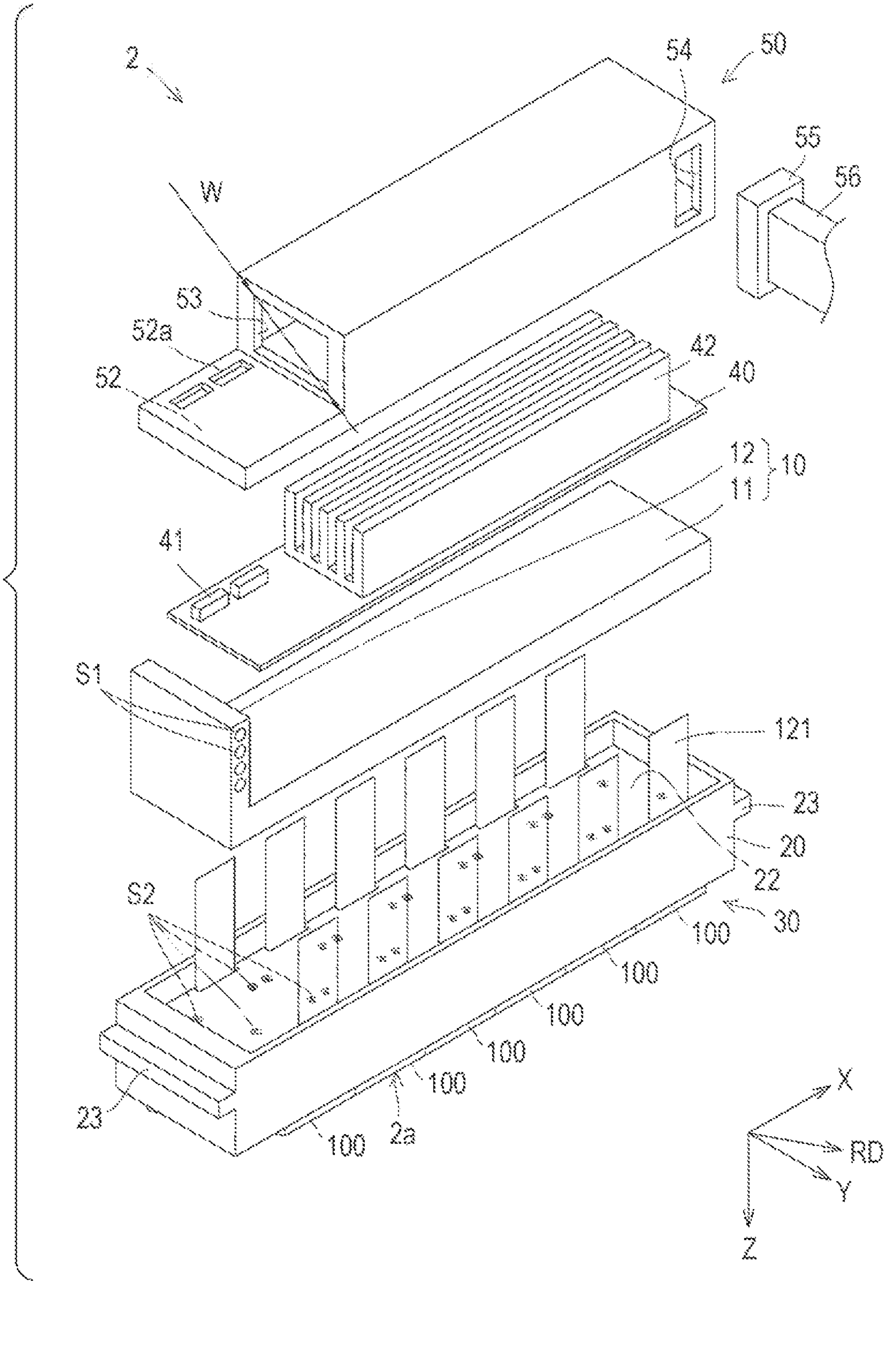
FIG. 2 is an exploded perspective view of a schematic configuration of a head unit according to the first embodiment.
Figure 3:
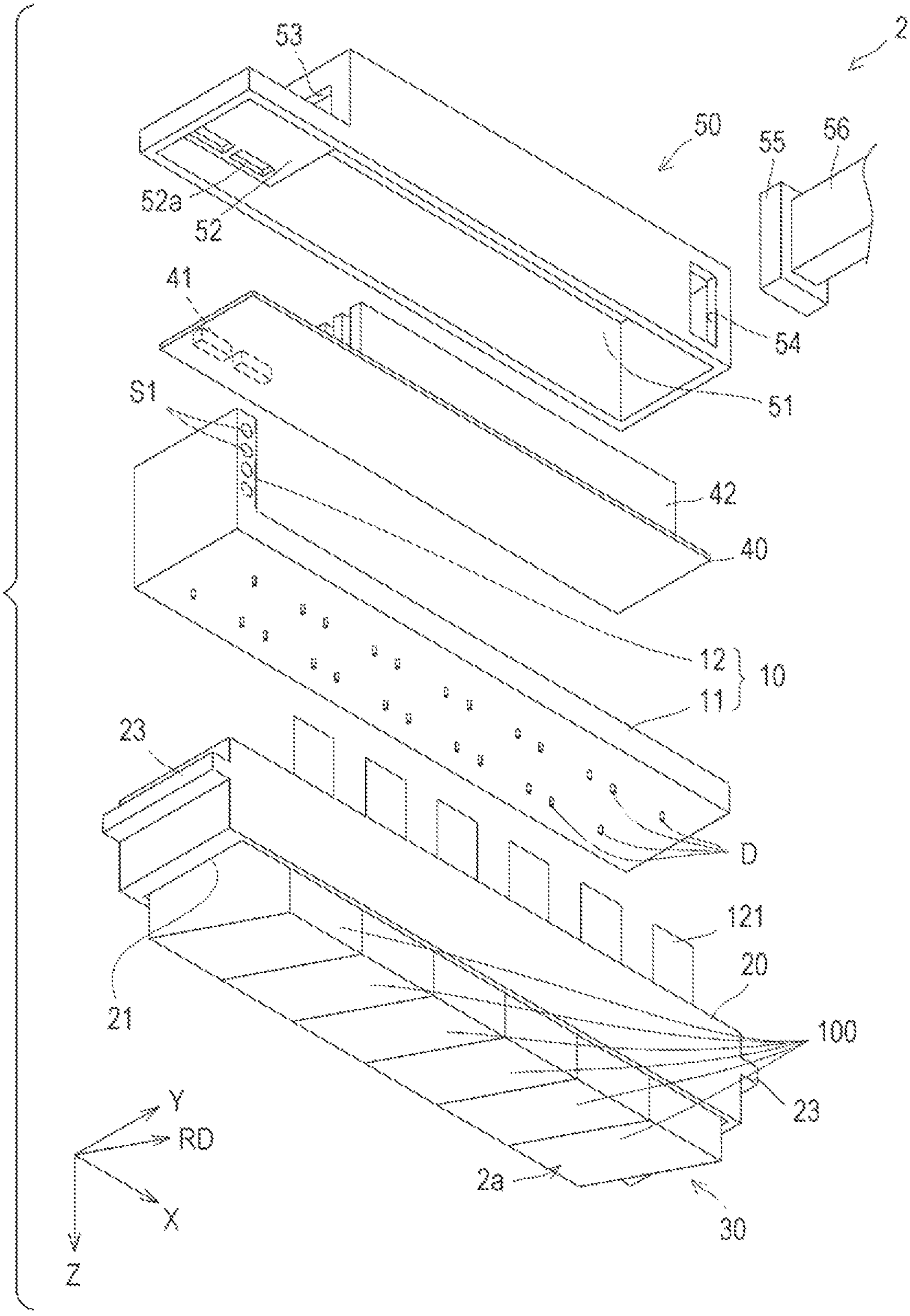
FIG. 3 is an exploded perspective view of a schematic configuration of the head unit according to the first embodiment.
Figure 4:
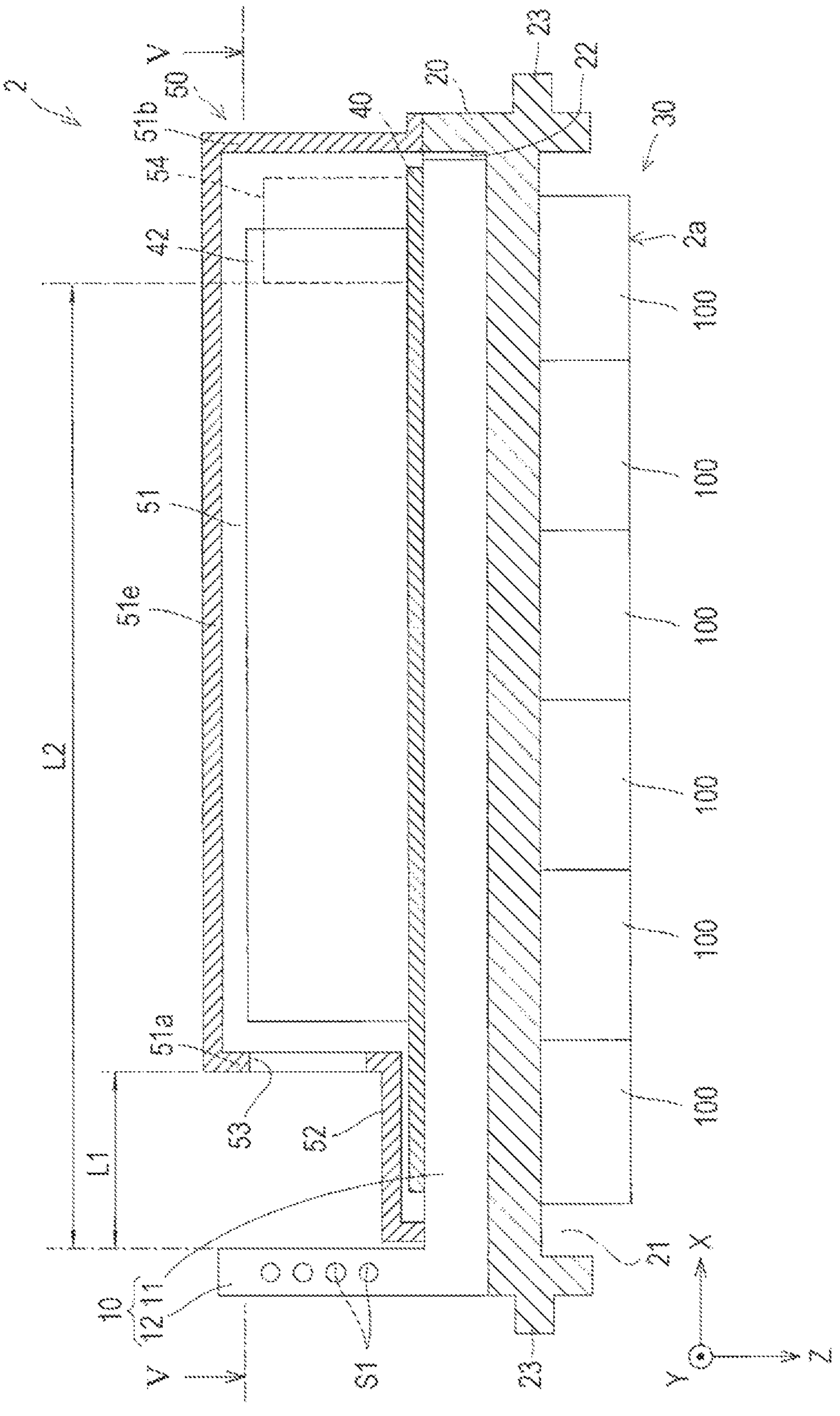
FIG. 4 is a sectional view of a main portion of the head unit according to the first embodiment.
Figure 5:
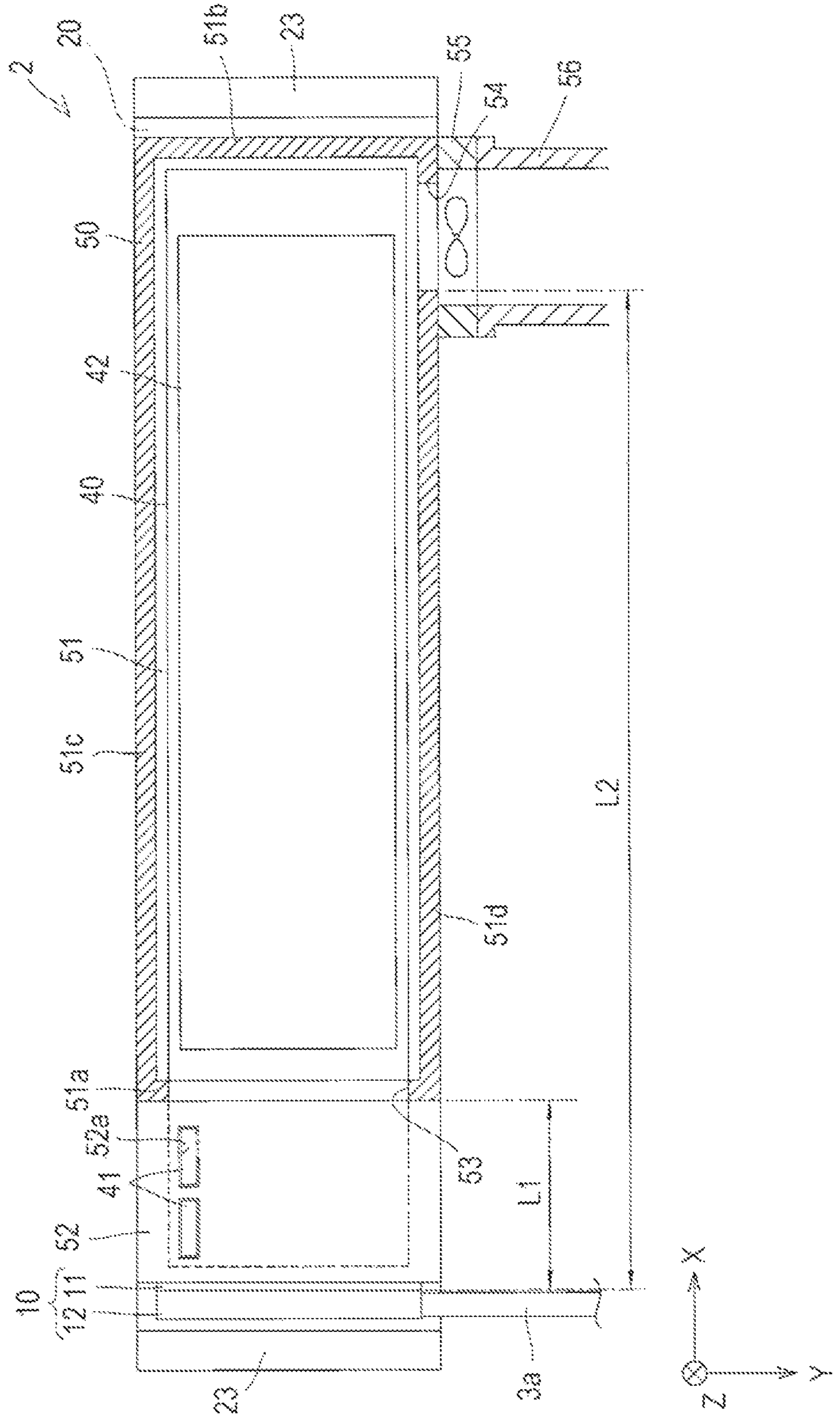
FIG. 5 is a sectional view of a main portion of the head unit according to the first embodiment.

FIGS. 2 and 3 are exploded perspective views illustrating a schematic configuration of the head unit 2 in the present embodiment. FIG. 4 is a sectional view of a main portion of the head unit 2 in a direction perpendicular to the Y axis. FIG. 5 is a sectional view of the main portion taken along line V-V in FIG. 4.

As illustrated in FIGS. 2 to 5, the head unit 2 includes a flow passage member 10 having the ink supplied from the liquid storage portion 3, a liquid ejecting portion 30 having a plurality of liquid ejecting heads 100 that eject the ink supplied from the flow passage member 10, a circuit substrate 40 for driving the head unit 2, a unit base 20 supporting the liquid ejecting portion 30 and the flow passage member 10, and a cover 50 accommodating the flow passage member 10 and the circuit substrate 40 between the cover 50 and the unit base 20. In the head unit 2, the circuit substrate 40, the flow passage member 10, the unit base 20, and the liquid ejecting portion 30 are sequentially stacked toward the +Z direction, and the cover 50 is disposed so as to accommodate the flow passage member 10 and the circuit substrate 40 in the −Z direction of the liquid ejecting portion 30. The flow passage member 10, the unit base 20, the liquid ejecting portion 30, the circuit substrate 40, and the cover 50 are fixed to each other with an adhesive (not illustrated), screws, or the like.

The flow passage member 10 has a plurality of first introduction ports S1 according to the number of types of ink supplied to the head unit 2 and a plurality of discharge ports D according to the number of types of ink and the number of a plurality of liquid ejecting heads 100. FIGS. 2 and 3 illustrate that the flow passage member 10 has four first introduction ports S1 and 24 discharge ports D.

The flow passage member 10 includes a flow passage member main body 11 and the flow passage coupling portion 12. The flow passage member main body 11 has a rectangular shape whose direction along the X axis when viewed in the +Z direction is a longitudinal direction and whose direction along the Y axis is a transverse direction. That is, the flow passage member main body 11 extends along the X axis. The flow passage coupling portion 12 protrudes from an end portion of the flow passage member main body 11 in the −X direction toward the −Z direction. The flow passage member main body 11 and the flow passage coupling portion 12 are integrally formed.

The plurality of first introduction ports S1 are provided in the flow passage coupling portion 12.

Specifically, the plurality of first introduction port S1 is located on a side surface of the flow passage coupling portion 12 in the +Y direction. A tube 3*a* coupled to the liquid storage portion 3 is coupled to the flow passage coupling portion 12 where the first introduction port S1 is opened. That is, the tube 3*a* is an example of an "external flow passage member" coupled to the flow passage coupling portion 12.

The discharge port D is located on a surface of the flow passage member main body 11 on the +Z direction side. In the flow passage member 10, a flow passage communicating between any one of the first introduction ports S1 and at least one of the discharge ports D is formed. That is, one end of the flow passage that is provided inside the flow passage member 10 is the first introduction port S1, and the other end is the discharge port D.

In the present embodiment, the flow passage member 10 includes only the flow passage member main body 11 and the flow passage coupling portion 12. In addition, the flow passage member 10 may not include a flexible tube such as the tube 3*a*. That is, the flow passage member 10 may be formed of only a rigid body. When a flow passage needle or a flow passage pipe as the rigid body is provided on an end portion of the tube 3*a* on a side coupled to the flow passage member 10, the tube 3*a* and the flow passage coupling portion 12 may be airtightly coupled to each other by press-fitting the flow passage needle or the flow passage pipe into the first introduction port S1 of the flow passage coupling portion 12. In this case, the first introduction port S1 may include a flexible sealing member therein in order to airtightly couple the flow passage needle or the flow passage pipe. Further, the flow passage coupling portion 12 may be a flow passage needle or a flow passage pipe that protrudes from the flow passage member main body 11 to the −Z direction and having the first introduction port S1 formed on a tip thereof.

The liquid ejecting portion 30 has a plurality of liquid ejecting heads 100, and in the present embodiment, six liquid ejecting heads 100. The plurality of liquid ejecting heads 100 are located on the unit base 20 in the +Z direction and fixed to the unit base 20 with an adhesive (not illustrated), screws, or the like. In the present embodiment, the plurality of liquid ejecting heads 100 are fixed into a head accommodating portion 21 having a recessed shape opening to a surface of the unit base 20 in the +Z direction. That is, the plurality of liquid ejecting heads 100 are fixed to a bottom surface of the head accommodating portion 21, that is, to a surface defining the head accommodating portion 21 in the −Z direction. The head accommodating portion 21 in the present embodiment has a size for accommodating six liquid ejecting heads 100. The unit base 20 has a plurality of opening portions corresponding to the plurality of discharge ports D formed therein. In addition, a plurality of second introduction ports S2 are provided on each liquid ejecting head 100 in the −Z direction. The plurality of second introduction ports S2 are coupled to the plurality of discharge ports D of the flow passage member 10, respectively, through the plurality of opening portions formed in the unit base 20. That is, the liquid ejecting portion 30 has the plurality of second introduction ports S2 each corresponding to the plurality of discharge ports D of the flow passage member 10.

Moreover, a first accommodating portion 22 having a recessed shape opening to the surface in the −Z direction is provided on the unit base 20 in the −Z direction. The flow passage member 10 is accommodated in the first accommodating portion 22.

In the present embodiment, six liquid ejecting heads 100 are provided on one head unit 2. However, the number of the liquid ejecting heads 100 provided on one head unit 2 is not particularly limited thereto. One head unit 2 may include only one liquid ejecting head 100, or may include two or more liquid ejecting heads 100.

Moreover, a flange portion 23 is provided on end portions of the unit base 20 in the +X direction and in the −X direction. In the head unit 2, the flange portion 23 is fastened and fixed to the apparatus main body 6 by a fixing member such as screws or the like. That is, a fixing region where the head unit 2 is fixed to the apparatus main body 6 is a flange portion 23.

Here, a flow of the ink until the ink stored in the liquid storage portion 3 is supplied to the liquid ejecting head 100 of the head unit 2 will be described. The ink stored in the liquid storage portion 3 is supplied to the first introduction port S1 of the flow passage member 10 through the tube 3*a*. The ink supplied to the first introduction port S1 is distributed by a flow passage (not illustrated) provided inside the flow passage member main body 11, and the ink is then supplied to the second introduction port S2 of each of six liquid ejecting heads 100 of the liquid ejecting portion 30 through the discharge port D. That is, the flow passage member 10 functions as a distribution flow passage member that distributes and supplies the ink supplied from the first introduction port S1 to the head unit 2 to each of the plurality of liquid ejecting heads 100 of the head unit 2.

In the present embodiment, the flow passage member 10 is the distribution flow passage member. However, the flow passage member 10 may be provided with a recovery flow passage for discharging the ink, which has not been ejected from the liquid ejecting head 100, to the outside of the head unit 2. Specifically, a merging flow passage is formed in the flow passage member main body 11 to merge and recover the ink which has not been ejected from the plurality of liquid ejecting heads 100, and a discharge port is formed in the flow passage coupling portion 12 to discharge the ink flowing through the merging flow passage to the outside of the head unit 2. The discharge port may be formed as a part of the flow passage member main body 11. By using the flow passage coupling portion 12 for supplying the ink, the discharge port may be provided separately from the flow passage coupling portion 12, and may be formed in the flow passage coupling portion for recovery, stacked on the flow passage member main body 11.

Figure 6:
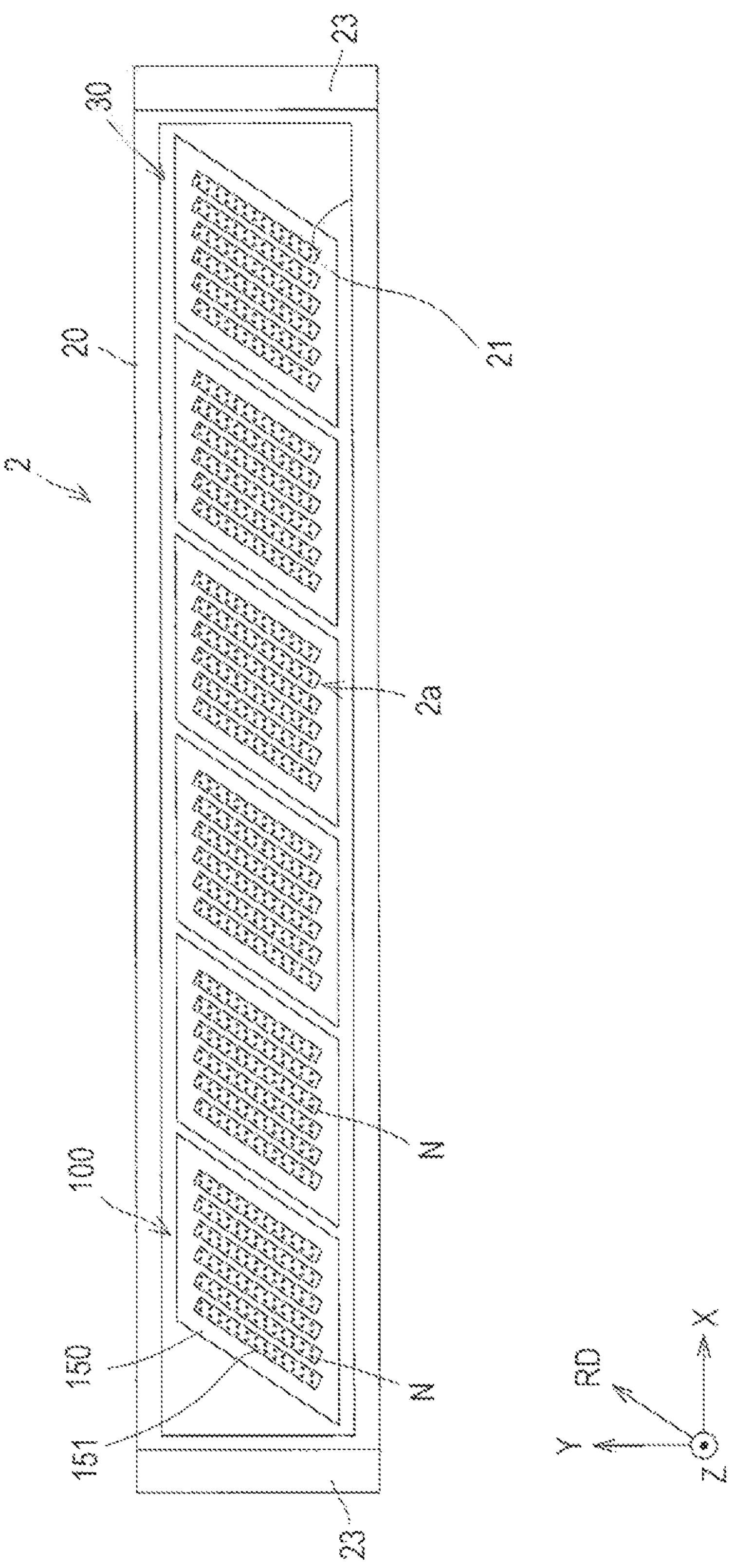
FIG. 6 is a bottom view of the head unit according to the first embodiment.

Here, an example of an arrangement of the plurality of liquid ejecting heads 100 in the head unit 2 will be described. FIG. 6 is a bottom view of the head unit 2 when viewed in the −Z direction.

As illustrated in FIG. 6, the plurality of the liquid ejecting heads 100 of the head unit 2 each have six head chips 140 (see FIG. 7) arranged side by side along the +X direction. In addition, each head chip 140 has a plurality of nozzles N for ejecting the supplied ink onto the medium S. The plurality of nozzles N of each head chip 140 are arranged side by side along a row direction RD in a direction perpendicular to the Z axis and in an XY plane defined by the X axis and the Y axis. The row direction RD is a direction to be inclined to both the X axis and the Y axis. In the following description, a row in which the plurality of nozzles N are arranged side by side along the row direction RD may be referred to as a nozzle row. The number of head chips 140 included in each of the plurality of liquid ejecting heads 100 is not limited to six.

Figure 7:
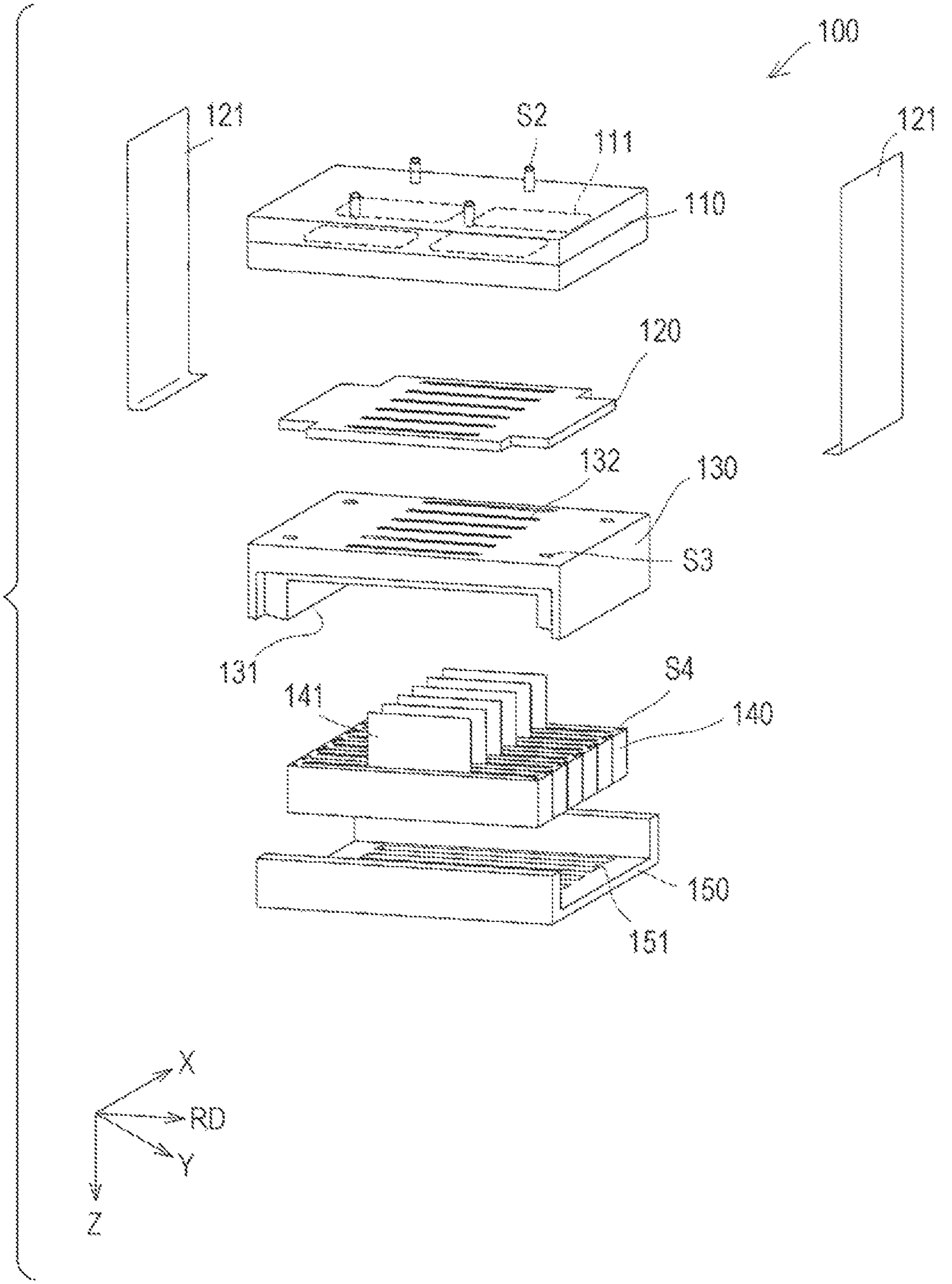
FIG. 7 is an exploded perspective view of a schematic configuration of a liquid ejecting head according to the first embodiment.

Next, an example of a structure of the liquid ejecting head 100 will be described. FIG. 7 is an exploded perspective view of a schematic configuration of the liquid ejecting head 100.

Each liquid ejecting head 100 includes a filter portion 110, a wiring substrate 120, a holder 130, six head chips 140, and a fixing plate 150. The liquid ejecting head 100 is formed by sequentially superposing the filter portion 110, the wiring substrate 120, the holder 130, and the fixing plate 150 toward the +Z direction, and has the head chip 140 accommodated between the holder 130 and the fixing plate 150.

The filter portion 110 has a substantially parallel quadrilateral shape in which when viewed in the +Z direction, two sides facing each other extend along the +X direction, and other two sides facing each other extend along the row direction RD. The filter portion 110 includes four flow passage filters 111 and four second introduction ports S2. Four second introduction ports S2 are located in the filter portion 110 in the −Z direction, and provided corresponding to the four flow passage filters 111 that are located in the filter portion 110. The flow passage filter 111 collects foreign substances such as air bubbles and dust contained in the ink supplied from the second introduction port S2.

The wiring substrate 120 is located on the filter portion 110 in the +Z direction, and has a substantially parallel quadrilateral shape in which when viewed in the +Z direction, two sides facing each other in the +Z direction extend along the X axis and two sides facing each other extend along the row direction RD. A wiring member 141 led out from each head chip 140 to the −Z direction is electrically coupled to the wiring substrate 120. Further, coupling wirings 121 are coupled to both end portions of the wiring substrate 120, respectively, in the row direction RD. The coupling wiring 121 includes a flexible wiring substrate and a flexible wiring such as a flexible flat cable (FFC) and a flexible printed circuit (FPC). The two coupling wirings 121 electrically couple the circuit substrate 40 and the wiring substrate 120 through both sides of the filter portion 110 in the +Y direction and the −Y direction.

The holder 130 is located on the wiring substrate 120 in the +Z direction side, and has a substantially parallel quadrilateral shape in which when viewed in the +Z direction, two sides facing each other in the +Z direction extend along the X axis and two sides facing each other extend along the row direction RD. In addition, the holder 130 has a holding portion 131 having a groove-like space formed in the +Z direction. The holding portion 131 is continuously provided on a surface of the holder 130 in the +Z direction over the +X direction, so that the holding portion 131 is provided opening to the both side surfaces in the +X direction and the −X direction. The six head chips 140 are arranged in the holding portion 131 of the holder 130 along the +X direction and fixed with an adhesive or the like. In the present embodiment, the six head chips 140 are accommodated in one holding portion 131. However, the present embodiment is not limited thereto, and a plurality of holding portions 131 capable of separately accommodating each head chip 140 may be provided.

Moreover, four third introduction ports S3 are provided at four corners of the holder 130 in the −Z direction. Each of the third introduction ports S3 is coupled to the flow passage of the filter portion 110. Accordingly, the ink supplied from the second introduction port S2 of the filter portion 110 is supplied to the third introduction port S3 of the holder 130. The ink supplied to the third introduction port S3 is distributed to the six head chips 140 through the flow passage in the holder 130, and then supplied to the six head chips 140.

The head chip 140 has the nozzle N for ejecting the ink to the +Z direction side. In the present embodiment, two nozzle rows in which the nozzles N are arranged in the row direction RD are arranged in one head chip 140 along the X axis. In addition, the head chip 140 has a fourth introduction port S4 on the −Z direction side. The ink from the holder 130 is supplied to the head chip 140 through the fourth introduction port S4. Further, in each head chip 140, a flow passage including a pressure chamber that communicates with the nozzles N and the fourth introduction port S4, and a pressure generation unit that causes pressure change in the ink in the pressure chamber are provided. As the pressure generation unit, for example, a unit that ejects ink droplets from the nozzle N by changing a volume of the flow passage due to deformation of a piezoelectric actuator having a piezoelectric material for exhibiting an electromechanical conversion function and by causing pressure change in the ink in the flow passage, can be used. Further, as the pressure generation unit in addition to this, a unit that has a heat generating element disposed in the flow passage and ejects the ink droplets from the nozzle N by bubbles generated by heat of the heat generating element, a so-called electrostatic actuator that ejects the ink droplets from the nozzles N by generating an electrostatic force between a vibration plate and an electrode and deforming the vibration plate by the electrostatic force, or the like can be used. A nozzle surface where the nozzle N of the head chip 140 is opened constitutes a part of the ejection surface 2*a*.

The wiring member 141 coupled to an internal pressure generation unit (not illustrated) is derived from a surface of each head chip 140 on the −Z direction side. As the wiring member 141, a flexible sheet-like wiring substrate, for example, a flexible substrate such as a chip on film (COF) substrate and a flexible wiring such as the FFC or the FPC can be used. For example, a switching element for driving the pressure generation unit may or may not be mounted on the wiring member 141.

The holder 130 is provided with a wiring insertion hole 132 opening to a bottom surface of the holding portion 131, that is, a surface of the holding portion 131 in the −Z direction, and a surface on a side of the wiring substrate 120. The wiring member 141 of the head chip 140 held by the holding portion 131 is derived from the holder 130 in the −Z direction through the wiring insertion hole 132. A plurality of wiring members 141 derived from the holder 130 in the −Z direction are electrically coupled to the wiring substrate 120.

The fixing plate 150 is located on the +Z direction side of the holder 130. The fixing plate 150 is formed by bending a plate member such as a metal, so that an opening of the holding portion 131 is closed on side surfaces of the holder 130 in the +Y direction and the −Y direction side. In addition, the fixing plate 150 is provided with an exposure opening portion 151, which is a through-hole for exposing the nozzle N of each head chip 140. In the present embodiment, the exposure opening portion 151 is provided so as to be opened independently for each head chip 140. That is, the head unit 2 in the present embodiment has the six head chips 140, and thus the fixing plate 150 is provided with six independent exposure opening portions 151. The fixing plate 150 is bonded to the holder 130 and the plurality of head chips 140 via an adhesive. A surface of the fixing plate 150 in the +Z direction constitutes a part of the ejection surface 2*a*. That is, the ejection surface 2*a* of the head unit 2 in the present embodiment includes a nozzle surface where the nozzle N of the head chip 140 exposed by the exposure opening portion 151 is opened, and a surface opposite to the nozzle N of the fixing plate 150, in other words, a surface of the fixing plate 150 on a side where the exposure opening portion 151 is opened. That is, the ejection surface 2*a* of the head unit 2 includes a nozzle surface facing the medium S, where the nozzle N is opened, and a surface of the fixing plate 150 located on the medium S closer to the nozzle surface. Further, the ejection surface 2*a* includes a surface including a nozzle surface facing the medium S, where the nozzle N is opened, and includes a surface where the ink adheres due to the ejection of the ink among the surfaces of the head unit 2 facing the medium S. Furthermore, the ejection surface 2*a* includes a surface wiped by a wiping member such as elastomer or cloth (not illustrated). The ejection surface 2*a* may be formed by only the nozzle surface where the nozzle N is opened. Further, the nozzle N is a flow passage including an opening that forms a meniscus of the ink ejected by pressure change in the pressure chamber caused by driving the pressure generation unit.

On the other hand, the circuit substrate 40 of the head unit 2 is located on the flow passage member 10 on the −Z direction side, as illustrated in FIGS. 2 to 5. The circuit substrate 40 is a plate-like member having a substantially rectangular shape in which when viewed in the +Z direction, two sides facing each other extend along the +X direction and the other two sides facing each other extend along the +Y direction, and the circuit substrate 40 is a so-called a rigid substrate. In addition, the circuit substrate 40 is disposed in a direction in which a thickness direction is perpendicular to the ejection surface 2*a*, that is, in a direction in which the thickness direction is the same as the +Z direction. The circuit substrate 40 is disposed in the direction in which the thickness direction is the same as the +Z direction, such that it is possible to prevent an increase in size of the head unit 2 in the +Z direction and to achieve a reduction in size of the head unit 2.

The circuit substrate 40 is formed with a drive signal generation circuit (not illustrated) that outputs a drive signal for driving the pressure generation unit of the liquid ejecting head 100. The drive signal generation circuit includes wiring (not illustrated) and electronic components. Examples of the electronic components constituting drive signal generation circuit include a capacitor, a transistor, and an integrated circuit. In addition, the circuit substrate is provided with two connectors 41, which are examples of the electronic component, on a surface thereof in the −Z direction. The control unit 4 is coupled to the connector 41 through wiring (not illustrated), and a power supply voltage of the head unit 2, a positional information signal representing a transport position of the medium S, image information, and the like are input from the control unit 4. The circuit substrate 40 generates the drive signal for driving the pressure generation unit or a control signal for supplying the drive signal, such as a timing signal, from the power supply voltage, the positional information signal, and the image signal received through the connector 41, and outputs the generated drive signal or control signal to each liquid ejecting head 100.

Moreover, a heat sink 42 for dissipating heat generated in the electronic components (not illustrated) is attached to a surface of the circuit substrate 40 on the −Z direction side. That is, in an accommodation space formed by a first accommodating portion 22 and a second accommodating portion 51 to be described later, the circuit substrate 40 is disposed between the flow passage member main body 11, which is a part of the flow passage member 10, and the heat sink 42. As such, the heat sink 42 is provided on the circuit substrate 40, such that it is possible to improve a cooling effect of the electronic components of the circuit substrate 40. Further, because the circuit substrate 40 is disposed between the heat sink 42 and the flow passage member main body 11, heat of the heat sink 42 is hardly conducted to the flow passage member main body 11, and it is thus possible to prevent the ink in the flow passage member main body 11 from being heated. That is, the circuit substrate 40 is disposed in a casing, which will be described later in detail, so that the accommodation space, which will be described later in detail, is defined into a space where the flow passage member main body 11 is disposed and a space where the heat sink 42 is disposed.

The circuit substrate 40 is provided with the drive signal generation circuit, thus easily generating heat as compared with a relay substrate that relays coupling between wirings. Therefore, the circuit substrate 40 generates heat by ejecting the ink to the head unit 2, such that cooling is required for the circuit substrate 40 to prevent the drive signal generation circuit from running away or being destroyed by the heat. Of course, in the present embodiment, the circuit substrate 40 is provided with the drive signal generation circuit. However, the present embodiment is not particularly limited thereto, and the circuit substrate 40 may not be formed with the drive signal generation circuit and may be formed with the wiring or the like.

Moreover, the coupling wirings 121 of the plurality of liquid ejecting heads 100 are electrically coupled to the circuit substrate 40. Specifically, the coupling wirings 121 of the liquid ejecting head 100 pass through the outside of the flow passage member 10 in the +Y direction and the −Y direction and are electrically coupled to a surface of the circuit substrate 40 in the +Z direction. Further, the circuit substrate 40 is a common substrate to which the coupling wirings 121 of the six liquid ejecting heads 100 are commonly coupled. Of course, the circuit substrate 40 may be divided into two or more. Further, a plurality of circuit substrates 40 may be stacked along the Z axis.

The cover 50 has the second accommodating portion 51 opening in the +Z direction. The second accommodating portion 51 is defined by a first wall portion 51*a* provided in the −X direction, a second wall portion 51*b* provided in the +X direction, a third wall portion 51*c* provided in the −Y direction, a fourth wall portion 51*d* provided in the +Y direction, and a ceiling portion 51*e* provided in the −Z direction. Further, the cover 50 has an extension portion 52 extending in the −X direction from the first wall portion 51*a*. By fixing the cover 50 to a surface of the unit base 20 in the −Z direction, the "accommodation space" formed by the first accommodating portion 22 and the second accommodating portion 51 is defined between the unit base 20 and the cover 50. The circuit substrate 40 is accommodated in the accommodation space, in the present embodiment, in the second accommodating portion 51. That is, the cover 50 and the unit base 20 in the present embodiment are a "casing" for defining the accommodation space. In addition, the flow passage member main body 11, which is a part of the flow passage member 10 is accommodated in the first accommodating portion 22 of the accommodation space. The flow passage coupling portion 12 of the flow passage member 10 is provided outside the accommodation space.

The flow passage coupling portion 12 and the first wall portion 51*a* are disposed at a position where they face each other at an interval. Further, the flow passage coupling portion 12 is disposed at a position overlapping with the accommodation space with respect to a direction perpendicular to the ejection surface 2*a*, that is, the +Z direction in the present embodiment. Here, the "flow passage coupling portion 12 is disposed at a position overlapping with the accommodation space with respect to the +Z direction" means that the flow passage coupling portion 12 and the second accommodating portion 51 forming the accommodation space overlap with each other in an in-plane direction of the XY plane defined by the X axis and the Y axis perpendicular to the +Z direction, and in the present embodiment, means that at least a part of the flow passage coupling portion 12 overlaps with the second accommodating portion 51 when viewed in the +X direction. In the present embodiment, the flow passage coupling portion 12 is disposed at a position that completely overlaps with the second accommodating portion 51 when viewed in the +X direction, but only a part of the flow passage coupling portion 12 may overlap with the second accommodating portion 51 when viewed in the +X direction. The flow passage coupling portion 12 is disposed in the accommodation space with respect to the +Z direction, in the present embodiment, at a position overlapping with the second accommodating portion 51, such that it is possible to prevent the increase in size of the head unit 2 in the +Z direction, as compared with case in which the flow passage coupling portion 12 is disposed at a position not overlapping with the accommodation space with respect to the +Z direction.

Moreover, the cover 50 is provided with an intake port 53 and an exhaust port 54 for communicating between the second accommodating portion 51 and the outside.

The intake port 53 is an opening for sucking the air from the outside to the inside of the second accommodating portion 51. The intake port 53 is disposed closer to the flow passage coupling portion 12 than to the exhaust port 54. Specifically, the intake port 53 in the present embodiment penetrates the first wall portion 51*a* over the X axis. That is, the intake port 53 in the present embodiment is provided at a position facing the flow passage coupling portion 12. Therefore, the intake port 53 and the flow passage coupling portion 12 are disposed at an interval from each other in the +X direction. The intake port 53 is preferably open in a relatively wide area, and in the present embodiment, the intake port 53 is opened over the substantially entire surface of the first wall portion 51*a*.

The exhaust port 54 is an opening for exhausting the air inside the second accommodating portion 51 to the outside. The exhaust port 54 is disposed farther from the flow passage coupling portion 12 than the intake port 53. Specifically, the exhaust port 54 penetrates an end portion side of the fourth wall portion 51*d* in the −X direction over the Y axis. That is, the circuit substrate 40 is disposed so that a direction along the +X direction is the longitudinal direction, the intake port 53 is provided on one end side of the second accommodating portion 51 in the +X direction, in the present embodiment, on the end portion of the second accommodating portion 51 in the −X direction, and the exhaust port 54 is provided on the other end side of the second accommodating portion 51 in the +X direction, in the present embodiment, on an end portion side of the second accommodating portion 51 in the +X direction.

The flow passage coupling portion 12 is disposed at a position facing the intake port 53 at an interval from the intake port 53 of the cover 50 in the −X direction. That is, the intake port 53 is provided in an end portion of the second accommodating portion 51 in the −X direction. On the other hand, the exhaust port 54 is provided on an end portion side of the second accommodating portion 51 in the −X direction, which is a side opposite to the flow passage coupling portion 12 of the second accommodating portion 51. Therefore, the flow passage coupling portion 12 is disposed closer to the intake port 53 than to the exhaust port 54. The "flow passage coupling portion 12 is disposed closer to the intake port 53 than to the discharge port 54" means that a distance L1 between the flow passage coupling portion 12 and the intake port 53 in a direction along the X axis is shorter than a distance L2 between the flow passage coupling portion 12 and the exhaust port 54, when viewed in the +Z direction. That is, the distance L1 and the distance L2 satisfy a relationship of L1<L2.

In the present embodiment, the intake port 53 has a rectangular shape when viewed in the +X direction. In addition, the exhaust port 54 has a rectangular shape when viewed in the −Y direction. Of course, the shape of the opening of the intake port 53 and the exhaust port 54 is not particularly limited thereto, and may be a circular shape, an elliptical shape, a polygonal shape, and the like.

The exhaust port 54 of the cover 50 is provided with an exhaust fan 55 for blowing the air inside the second accommodating portion 51 to the outside. The exhaust fan 55 is an "air blowing mechanism" in which the air inside the second accommodating portion 51 is blown to the outside of the second accommodating portion 51 to generate a negative pressure inside the second accommodating portion 51 relative to the outside and sends the air inside the second accommodating portion 51 from the outside of the second accommodating portion 51 through the intake port 53. The air blowing mechanism is not particularly limited thereto, and may be provided with a suction fan, on the intake port 53, which blows the air from the outside toward the inside of the second accommodating portion 51, or may be provided with both the suction fan and the exhaust fan. Further, the air blowing mechanism is not particularly limited to the suction fan and the exhaust fan, and may be a pressure-feeding pump feeding the external air from the intake port 53 into the second accommodating portion 51 or a suction pump sucking the air inside the second accommodating portion 51 from the exhaust port 54 to the outside.

By operating the exhaust fan 55 provided on the exhaust port 54, the air inside the second accommodating portion 51 is exhausted from the exhaust port 54 to the outside of the second accommodating portion 51. As such, the air inside the second accommodating portion 51 is exhausted from the exhaust port 54, thus generating a negative pressure inside the second accommodating portion 51 relative to the outside (for example, atmospheric pressure) and sucking the air outside the second accommodating portion 51 to the inside through the intake port 53. That is, the operation of the exhaust fan 55 causes the air to flow from the intake port 53 toward the exhaust port 54 along the +X direction in the second accommodating portion 51. That is, the air outside the second accommodating portion 51 is sucked inside the second accommodating portion 51 from the intake port 53, and the air sucked in the second accommodating portion 51 moves along the +X direction, thereby cooling the circuit substrate 40 and the heat sink 42. The air heated by cooling the circuit substrate 40 and the heat sink 42 in the second accommodating portion 51 is exhausted from the exhaust port 54 to the outside of the second accommodating portion 51.

That is, the air sucked from the intake port 53 flows inside the second accommodating portion 51 along the +X direction, and the flow passage coupling portion 12, the intake port 53, and the exhaust port 54 are sequentially arranged in the +X direction.

In the second accommodating portion 51, the air taken in from the intake port 53 flows toward the exhaust port 54 along the +X direction. Therefore, the circuit substrate 40 and the heat sink 42 are easily cooled on a side of the intake port 53 and hardly cooled on a side of the exhaust port 54 in comparison to the side of the intake port 53. This is because the air taken in from the intake port 53 is heated by cooling the side of the intake port 53 in the circuit substrate 40 and the heat sink 42, and the heated air heats the side of the exhaust port 54 in the circuit substrate 40 and the heat sink 42. That is, temperatures of the circuit substrate 40 and the heat sink 42 cooled by the air flowing in the second accommodating portion 51 are high on the +X direction side along the X axis and gradually decrease toward the −X direction. Therefore, by disposing the flow passage coupling portion 12 at a position closer to the intake port 53 than to the exhaust port 54, a part having the relatively low temperatures of the circuit substrate 40 and the heat sink 42 is disposed close to the flow passage coupling portion 12, and the ink passing through the flow passage coupling portion 12 is hardly heated by heat of the circuit substrate 40 and the heat sink 42. On the other hand, for example, when the flow passage coupling portion 12 is disposed at a position closer to the exhaust port 54 than to the intake port 53, a part having the relatively high temperatures of the circuit substrate 40 and the heat sink 42 is disposed close to the flow passage coupling portion 12, and the ink passing through the inside of the flow passage coupling portion 12 may be heated by heat of the circuit substrate 40 and the heat sink 42. When the ink in the flow passage coupling portion 12 is heated, problems, such as a decrease in the viscosity of the ink, deterioration of ejection characteristics of the ink ejected from the liquid ejecting head 100, and occurrence of ejection defects of the ink, occurs. In the present embodiment, the ink in the flow passage coupling portion 12 is hardly heated by the circuit substrate 40 and the heat sink 42, such that it is possible to prevent the decrease in the viscosity of the ink supplied to the liquid ejecting head 100, to prevent the deterioration of ejection characteristics of the ink ejected from the liquid ejecting head 100, and to prevent occurrence of ejection defects of the ink.

In the present embodiment, the flow passage coupling portion 12 as described above is located at a position facing the intake port 53, and the exhaust port 54 does not face the flow passage coupling portion 12. That is, the air sucked from the intake port 53 moves from the intake port 53 toward the exhaust port 54 in the +X direction, and the flow passage coupling portion 12, the intake port 53, and the exhaust port 54 are sequentially arranged in the +X direction. As such, by sequentially arranging the flow passage coupling portion 12, the intake port 53, and the exhaust port 54 in the +X direction, the flow passage coupling portion 12 is disposed at a position away from the second accommodating portion 51 of the accommodation space provided with the intake port 53 and the exhaust port 54 and at a position relatively far from the exhaust port 54. Therefore, the heat in the second accommodating portion 51 can be prevented from being conducted to the flow passage coupling portion 12 via the cover 50. Particularly, a part having a relatively high temperature on the side of the exhaust port 54 in the second accommodating portion 51 is relatively far from the flow passage coupling portion 12, such that it is possible to prevent the flow passage coupling portion 12 from being heated. Accordingly, the ink in the flow passage coupling portion 12 can be further prevented from being heated by the heat in the second accommodating portion 51. Further, since the exhaust port 54 is provided at a position not facing the flow passage coupling portion 12, it is possible to prevent the heated air exhausted from the exhaust port 54 from being blown to the flow passage coupling portion 12 and prevent the heating of the flow passage coupling portion 12.

Here, the distance L1 between the flow passage coupling portion 12 and the intake port 53 is preferably equal to or more than a maximum width W of the intake port 53. That is, the distance L1 and the maximum width W satisfy a relationship of $L1 \geq W$. The distance L1 between the flow passage coupling portion 12 and the intake port 53 is a minimum dimension between the flow passage coupling portion 12 and the intake port 53 in the +X direction. Moreover, the maximum width W of the intake port 53 means a maximum width W, which is a diagonal dimension of the intake port 53 illustrated in FIG. 2, because the intake port 53 in the present embodiment has a rectangular shape. By setting the distance L1 between the flow passage coupling portion 12 and the intake port 53 to the maximum width W or more of the intake port 53, it is possible to prevent a gap between the flow passage coupling portion 12 and the intake port 53 from inhibiting the suction of the air from the intake port 53, to efficiently suck the air from the intake port 53, and to efficiently cool the circuit substrate 40 and the heat sink 42. Further, by setting the distance L1 between the flow passage coupling portion 12 and the intake port 53 to the maximum width W or more of the intake port 53, it is possible to prevent the flow passage coupling portion 12 from being heated by radiant heat of the circuit substrate 40 and the heat sink 42 in the second accommodating portion 51. Therefore, the ink introduced from the first introduction port S1 can be prevented from being heated inside the flow passage coupling portion 12 by the circuit substrate 40 and the heat sink 42.

The air sucked from the intake port 53 flows into the second accommodating portion 51 along the +X direction, and the air is exhausted from the exhaust port 54 in the +Y direction different from the +X direction, which is a direction in which the air flows in the second accommodating portion 51. As such, the exhaust port 54 is provided in the cover 50 so as to exhaust the air in the +Y direction, the exhaust fan 55 coupled to the exhaust port 54 or an exhaust duct 56 coupled to the exhaust fan 55, which will be described in detail, can thus be disposed on the head unit 2 in the +Y direction. Therefore, the head unit 2 can be reduced in size in the +X direction, as compared with a case in which the exhaust fan 55 or the exhaust duct 56 is provided on the cover 50 on the +X direction side. Further, since the exhaust fan 55 or the exhaust duct 56 does not have to be disposed on the cover 50 in the +X direction, it is possible to prevent deterioration in workability when the head unit 2 is fixed to the apparatus main body 6 without covering the flange portion 23 of the unit base 20 by the exhaust fan 55 or the exhaust duct 56 in order to fix the head unit 2 to the apparatus main body 6.

In the present embodiment, the circuit substrate 40 is disposed in the longitudinal direction along the +X direction, the intake port 53 is provided on the end portion of the second accommodating portion 51 on the −X direction side, which is one end portion side of the second accommodating portion 51 in the +X direction, and the exhaust port 54 is provided on the end portion side of the second accommodating portion 51 in the +X direction, which is the other end portion side of the second accommodating portion 51 in the +X direction. Therefore, it is possible to form a flow of the air along the longitudinal direction of the circuit substrate 40 in the second accommodating portion 51, and to efficiently cool the circuit substrate 40 and the heat sink 42 with the air by increasing a distance at which the air flowing in the second accommodating portion 51 comes into contact with the circuit substrate 40 and the heat sink 42.

In the present embodiment, the intake port 53 is disposed at the position facing the flow passage coupling portion 12. That is, the intake port 53 is provided in the first wall portion 51*a*. The intake port 53 is provided in the first wall portion 51*a*, such that it is possible to achieve a reduction in size of the head unit 2 and the ink jet recording apparatus 1 in a direction along the Y axis, as compared with a case in which the intake port 53 is provided in the third wall portion 51*c* or the fourth wall portion 51*d*. That is, when the intake port 53 is provided at a position not facing the flow passage coupling portion 12, for example, in the third wall portion 51*c* or the fourth wall portion 51*d*, another member cannot be provided at a position to close the intake port 53. Therefore, the intake port 53 needs to be disposed with a gap between the third wall portion 51*c* or the fourth wall portion 51*d* and another member, thus resulting in an increase in size of the ink jet recording apparatus 1 along the Y axis. Similarly, when the flow passage coupling portion 12 is provided at a position protruding in the +Y direction or the −Y direction from the cover 50 of the head unit 2 so that the intake port 53 does not face the flow passage coupling portion 12, the head unit 2 is increased in size along the Y axis. In the present embodiment, the flow passage coupling portion 12 and the intake port 53 are disposed facing each other, the flow passage coupling portion 12 is thus not required to be disposed at a position protruding in the +Y direction or the −Y direction from the cover 50, and the head unit 2 and the ink jet recording apparatus 1 can be reduced in size in the direction along the Y axis.

In the present embodiment, the first introduction port S1 of the flow passage coupling portion 12 is provided opening to the side surface in the +Y direction. That is, the first introduction port S1 of the flow passage coupling portion 12 is provided at a position not facing the intake port 53. Therefore, when the tube 3*a* is coupled to the first introduction port S1, it is not required to couple the tube 3*a* at a narrow place between the flow passage coupling portion 12 and the intake port 53, such that it is possible to easily perform a coupling work. Also, the tube 3*a* hardly closes the intake port 53, such that it is possible to prevent the suction of the air from the intake port 53 from being inhibited by the tube 3*a*.

In the present embodiment, as illustrated in FIG. 1, one end of the exhaust duct 56 is coupled to the exhaust fan 55. The other end of the exhaust duct 56 is provided outside the ink jet recording apparatus 1, that is, opening to an outer surface of the apparatus main body 6. Therefore, the air exhausted from the inside of the second accommodating portion 51 to the outside by the exhaust fan 55 is exhausted to the outside of the ink jet recording apparatus 1 through the exhaust duct 56. When the exhaust duct 56 is provided, a position of the exhaust fan 55 is not particularly limited, and the exhaust fan 55 may be provided inside the exhaust duct 56 by coupling one end of the exhaust duct 56 to the exhaust port 54. Further, the exhaust fan 55 may be provided on the other end side of the exhaust duct 56, that is, an outer surface side of the apparatus main body 6. The exhaust duct 56 is provided, such that the exhaust fan 55 can exhaust the air in the second accommodating portion 51 to the outside of the ink jet recording apparatus 1. Therefore, it is possible to prevent the heated air exhausted from the exhaust port 54 from being sucked from the intake port 53. That is, by providing the exhaust duct 56, the air heated by cooling the circuit substrate 40 and the heat sink 42 in the second accommodating portion 51 is exhausted to the outside of the ink jet recording apparatus 1, and the heated air exhausted from the exhaust port 54 is hardly sucked from the intake port 53 to the inside of the second accommodating portion 51. Accordingly, the air heated in the second accommodating portion 51 can be prevented from being sucked again from the intake port 53 to efficiently cool the circuit substrate 40 and the heat sink 42 in the second accommodating portion 51 with the air that is not heated.

The cover 50 is formed of a resin material or a metal material. In the present embodiment, the cover 50 is formed of the resin material, such that it is possible to achieve reduction in weight and costs.

Moreover, the extension portion 52 of the cover 50 is provided with an opening portion 52*a* for exposing the connector 41 of the circuit substrate 40 to the outside in the −Z direction. External wiring (not illustrated) from the control unit 4 is coupled to the connector 41 through the opening portion 52*a*.

As described above, in the present embodiment, the head unit 2 configured to eject the ink as a liquid includes a circuit substrate 40 for driving the head unit 2, and the casing including the cover 50 for defining the first accommodating portion 22 and the second accommodating portion 51, which is the accommodation space accommodating the circuit substrate 40. In addition, the head unit 2 includes the flow passage member 10 of which a part is disposed in the casing, including the flow passage coupling portion 12 for coupling to the tube 3*a*, which is the flow passage member outside the head unit 2. Further, the cover 50 has the intake port 53 for sucking the air from the outside of the cover 50 to the second accommodating portion 51, and the exhaust port 54 for exhausting the air passing through the second accommodating portion 51. The flow passage coupling portion 12 is disposed outside the casing and disposed closer to the intake port 53 than to the exhaust port 54.

Since the air taken in from the intake port 53 flows toward the exhaust port 54, the circuit substrate 40 is easily cooled on the side of the intake port 53 and hardly cooled on the side of the exhaust port 54 in comparison to the side of the intake port 53. Therefore, by disposing the flow passage coupling portion 12 close to the intake port 53, the heat of the circuit substrate 40 is hardly conducted to the flow passage coupling portion 12, and the ink in the flow passage coupling portion 12 is hardly heated, as compared with a configuration in which the flow passage coupling portion 12 is disposed close to the exhaust port 54. As such, since the ink in the flow passage coupling portion 12 is hardly heated by the circuit substrate 40, it is possible to prevent the decrease in the viscosity of the ink supplied from the flow passage coupling portion 12 to the liquid ejecting head 100, to prevent the deterioration of ejection characteristics of the ink ejected from the liquid ejecting head 100, and to prevent occurrence of ejection defects of the ink.

In the head unit 2 of the present embodiment, it is preferable that the intake port 53 faces the flow passage coupling portion 12. As such, the intake port 53 and the flow passage coupling portion 12 face each other, such that it is possible to achieve the reduction in size of the head unit 2 in the direction along the Y axis. That is, when the intake port 53 is provided at a position not facing the flow passage coupling portion 12, for example, in the third wall portion 51*c* or the fourth wall portion 51*d*, other members cannot be provided at a position to close the intake port 53.

Therefore, the intake port 53 needs to be disposed with a gap between the third wall portion 51*c* or the fourth wall portion 51*d* and another member, thus resulting in an increase in size of the ink jet recording apparatus 1 along the Y axis. Similarly, when the flow passage coupling portion 12 is provided at a position protruding in the +Y direction or the −Y direction from the cover 50 of the head unit 2 so that the intake port 53 does not face the flow passage coupling portion 12, the head unit 2 is increased in size along the Y axis. In the present embodiment, the flow passage coupling portion 12 and the intake port 53 are disposed facing each other, the flow passage coupling portion 12 is not thus required to be disposed at a position protruding in the +Y direction or the −Y direction from the cover 50, and the head unit 2 and the ink jet recording apparatus 1 can be reduced in size in the direction along the Y axis.

In the head unit 2 of the present embodiment, the distance L1 between the intake port 53 and the flow passage coupling portion 12 is preferably equal to or more than the maximum width W of the intake port 53. By sufficiently separating the flow passage coupling portion 12 and the intake port 53 from each other, it is possible to prevent the flow passage coupling portion 12 from inhibiting the suction of the air from the intake port 53, and it is possible to prevent the flow passage coupling portion 12 from being heated by radiant heat of the circuit substrate 40 in the second accommodating portion 51.

In the head unit 2 of the present embodiment, it is preferable that the first introduction port S1, which is an opening of the flow passage formed in the flow passage coupling portion 12, does not face the intake port 53. The first introduction port S1 is provided at a position where the first introduction port S1 does not face the intake port 53, such that the tube 3*a* is not required to be coupled to the first introduction port S1 at a narrow place between the flow passage coupling portion 12 and the intake port 53, and it is possible to easily perform the coupling work. Further, the tube 3*a* hardly closes the intake port 53, such that it is possible to prevent the suction of the air from the intake port 53 from being inhibited by the tube 3*a*.

In the head unit 2 of the present embodiment, it is preferable that the exhaust port 54 does not face the flow passage coupling portion 12. As such, the exhaust port 54 does not face the flow passage coupling portion 12, it is thus possible to prevent the heated air exhausted from the exhaust port 54 from being blown toward the flow passage coupling portion 12 and prevent the flow passage coupling portion 12 from being heated.

In the head unit 2 of the present embodiment, the air sucked from the intake port 53 moves from the intake port 53 toward the exhaust port 54 in the +X direction, which is the first direction, and the flow passage coupling portion 12, the intake port 53, and the exhaust port 54 are sequentially arranged in the +X direction. As such, by sequentially arranging the flow passage coupling portion 12, the intake port 53, and the exhaust port 54 in the +X direction, the flow passage coupling portion 12 is disposed at a position away from the second accommodating portion 51 and at a relatively far position from the exhaust port 54. Therefore, the heat in the second accommodating portion 51 can be prevented from being conducted to the flow passage coupling portion 12 via the cover 50. Particularly, a part having a relatively high temperature on the side of the exhaust port 54 in the second accommodating portion 51 is relatively far from the flow passage coupling portion 12, such that it is possible to prevent the flow passage coupling portion 12 from being heated.

In the head unit 2 of the present embodiment, it is preferable that the circuit substrate 40 is provided in the +X direction, which is the first direction, as a longitudinal direction, the intake port 53 is provided on one end side of the second accommodating portion 51 in the +X direction, which is a space from the intake port 53 to the exhaust port 54 in the accommodation space, and the exhaust port 54 is provided on the other end side of the second accommodating portion 51 in the +X direction. Since the air moves along the +X direction in the second accommodating portion 51 from the intake port 53 to the exhaust port 54, the circuit substrate 40 can have a large area coming into contact with the air flowing in the second accommodating portion 51 by making the longitudinal direction of the circuit substrate 40 coincide with the +X direction. Therefore, the circuit substrate 40 can be efficiently cooled.

In the head unit 2 of the present embodiment, it is preferable that the exhaust port 54 exhausts the air in the +Y direction, which is the second direction, different from the +X direction, which is the first direction. Accordingly, the exhaust port 54 is provided so as to exhaust the air to the +Y direction. Thus, the air blowing mechanism such as the exhaust fan 55 or the suction pump can be disposed in the +Y direction, rather than providing the exhaust port 54 so as to exhaust the air to the +X direction. Therefore, the head unit 2 can be reduced in size in the +X direction. Moreover, in the head unit 2, the flange portions 23, which are fixing regions for fixing the apparatus main body 6 with screws or the like, are provided on both sides of the unit base 20 in the +X direction and the −X direction. Therefore, when the air blowing mechanism is provided on the exhaust port 54, the flange portions 23 are not covered by the air blowing mechanism, such that it is possible to prevent workability from deteriorating when the head unit 2 is fixed to the apparatus main body 6.

In the head unit 2 of the present embodiment, it is preferable that the head unit 2 is a line head in which the plurality of liquid ejecting heads 100 are arranged in the +X direction, which is the first direction, and the circuit substrate 40 is a circuit substrate 40 common to the plurality of liquid ejecting heads 100.

In the head unit 2 of the present embodiment, it is preferable that the head unit 2 has the ejection surface 2*a* on which the plurality of nozzles N configured to eject the ink as the liquid are formed, and the flow passage coupling portion 12 overlaps with the accommodation space with respect to the +Z direction, which is a direction perpendicular to the ejection surface 2*a*. Accordingly, the flow passage coupling portion 12 and the accommodation space are disposed at a position where the flow passage coupling portion 12 and the accommodation space overlap with each other with respect to the +Z direction, such that it is possible to prevent an increase in size of the head unit 2 in the +Z direction and to achieve a reduction in size of the head unit 2.

In the head unit 2 of the present embodiment, it is preferable that the thickness direction of the circuit substrate 40 is the same as the +Z direction, which is the direction perpendicular to the ejection surface 2*a*. The circuit substrate 40 is disposed in the direction in which the thickness direction is the same as the +Z direction, such that it is possible to prevent the cover 50 from being increased in size in the +Z direction in order to form a large second accommodating portion 51 accommodating the circuit substrate 40 in the +Z direction, and it is possible to achieve the reduction in size of the head unit 2 in the +Z direction.

It is preferable that the head unit 2 of the present embodiment further includes the heat sink 42 for dissipating the heat of the circuit substrate 40, disposed on the second accommodating portion 51, which is the accommodation space. The flow passage member main body 11, which is a part of the flow passage member 10, is disposed in the first accommodating portion 22, which is the accommodation space, and the circuit substrate 40 is disposed between the flow passage member main body 11 disposed in the first accommodating portion 22, which is the accommodation space, and the heat sink 42. The heat sink 42 is provided on the circuit substrate 40, such that it is possible to improve a cooling effect of the electronic components of the circuit substrate 40. Further, because the circuit substrate 40 is disposed between the heat sink 42 and the flow passage member main body 11, heat of the heat sink 42 is hardly conducted to the flow passage member main body 11, and it is thus possible to prevent the ink in the flow passage member main body 11 from being heated.

It is preferable that in the head unit 2 of the present embodiment, the exhaust fan 55, which is the air blowing mechanism, introduces the air from the outside of the cover 50 through the intake port 53. By providing the air blowing mechanism represented by the exhaust fan 55 as such, the air for cooling the circuit substrate 40 can be taken into the accommodation space from the intake port 53 and exhaust the air from the exhaust port 54 to the outside.

The ink jet recording apparatus 1, which is an example of the liquid ejecting apparatus of the present embodiment, includes the head unit 2 described above, and the liquid storage portion 3 storing the ink, which is a liquid supplied to the head unit 2. The circuit substrate 40 can prevent the flow passage coupling portion 12 from being heated, such that it is possible to realize a liquid ejecting apparatus that prevents deterioration in ink ejection characteristics and prevents ink ejection defects.

Second Embodiment

Figure 8:
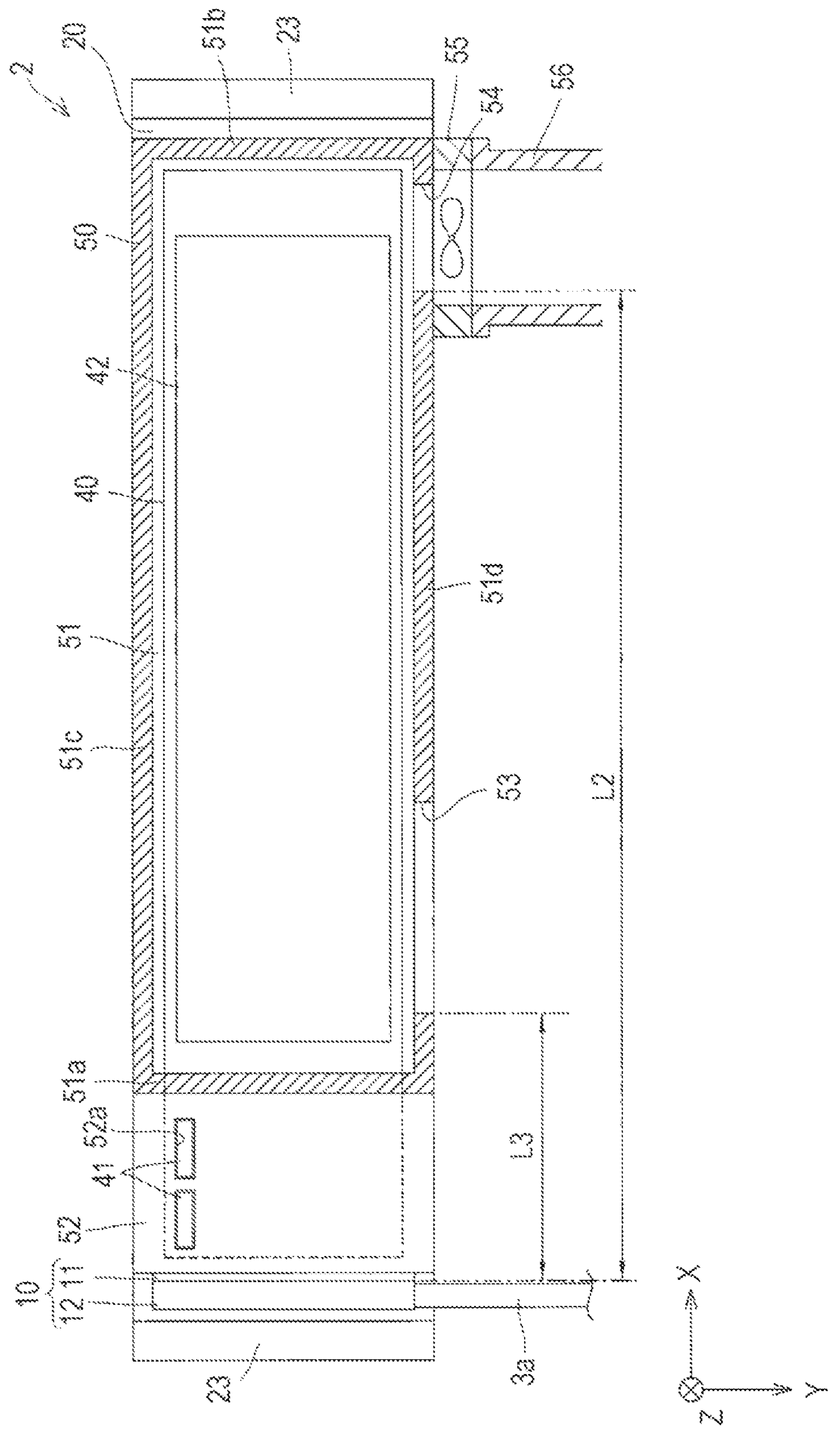
FIG. 8 is a sectional view of a main portion of a head unit according to a second embodiment.

FIG. 8 is a sectional view of a main portion of a head unit 2 according to a second embodiment of the present disclosure. The same reference numerals will be given to the same members as in the embodiment in the drawings, and a redundant description thereof will be omitted.

As illustrated in FIG. 8, in the head unit 2 of the present embodiment, the intake port 53 is provided on an end portion of the fourth wall portion 51*d* of the cover 50 on the −X direction side. That is, the exhaust port 54 is provided on an end portion of the fourth wall portion 51*d* on the +X direction side. That is, both the intake port 53 and the exhaust port 54 are disposed at a position not facing the flow passage coupling portion 12. Further, the flow passage coupling portion 12 is disposed at a position away from the first wall portion 51*a* in the −X direction. Therefore, the flow passage coupling portion 12 is disposed closer to the intake port 53 than to the exhaust port 54. A distance L3 between the flow passage coupling portion 12 and the intake port 53 is shorter than the distance L2 between the flow passage coupling portion 12 and the exhaust port 54 in a direction along the X axis. That is, the distance L3 and the distance L2 satisfy a relationship of L3<L2.

Other configurations of the head unit 2 are the same as those in the embodiments described above, and thus duplicate descriptions thereof will be omitted.

In such a head unit 2 of the present embodiment, by disposing the flow passage coupling portion 12 close to the intake port 53, the heat of the circuit substrate 40 is hardly conducted to the flow passage coupling portion 12, and the ink in the flow passage coupling portion 12 is hardly heated, as compared with a configuration in which the flow passage coupling portion 12 is disposed close to the exhaust port. As such, since the ink in the flow passage coupling portion 12 is hardly heated by the circuit substrate 40, it is possible to prevent the decrease in the viscosity of the ink supplied from the flow passage coupling portion 12 to the liquid ejecting head 100, to prevent the deterioration of ejection characteristics of the ink ejected from the liquid ejecting head 100, and to prevent occurrence of ejection defects of the ink.

Third Embodiment

Figure 9:
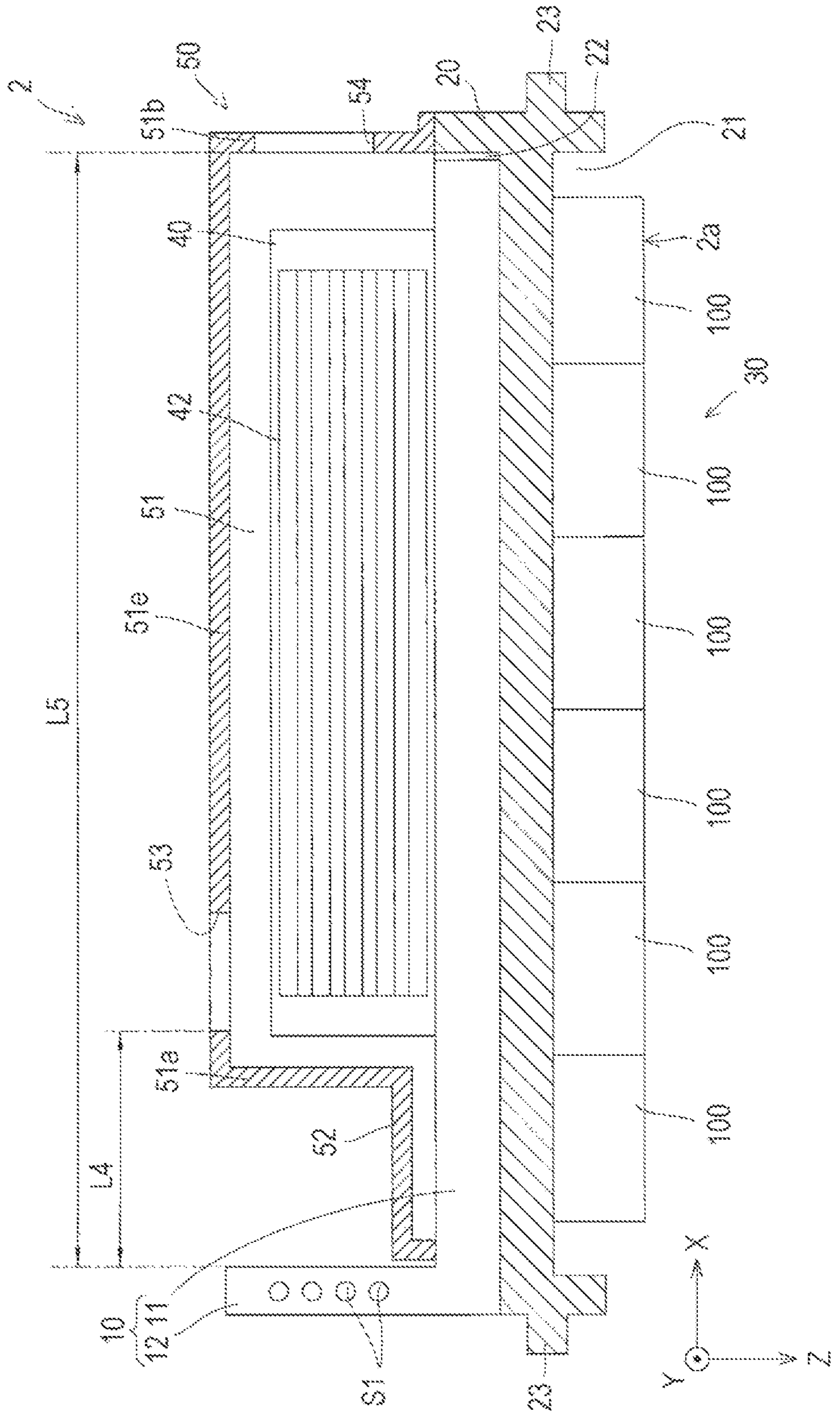
FIG. 9 is a sectional view of a main portion of a head unit according to a third embodiment.

FIG. 9 is a sectional view of a main portion of a head unit 2 according to a third embodiment of the present disclosure. The same reference numerals will be given to the same members as in the embodiment in the drawings, and a redundant description thereof will be omitted.

As illustrated in FIG. 9, in the head unit 2 of the present embodiment, the intake port 53 is provided on an end portion of the ceiling portion 51*e* of the cover 50 on the −X direction side. In addition, the exhaust port 54 is provided in the second wall portion 51*b*. That is, both the intake port 53 and the exhaust port 54 are disposed at a position not facing the flow passage coupling portion 12. Further, the flow passage coupling portion 12 is disposed at a position away from the first wall portion 51*a* in the −X direction. Therefore, the flow passage coupling portion 12 is disposed closer to the intake port 53 than to the exhaust port 54. A distance L4 between the flow passage coupling portion 12 and the intake port 53 is shorter than a distance L5 between the flow passage coupling portion 12 and the exhaust port 54 in a direction along the X axis. That is, the distance L4 and the distance L5 satisfy a relationship of L4<L5.

In the present embodiment, the circuit substrate 40 is disposed in a direction in which the thickness direction is the same as the +Y direction. That is, the circuit substrate 40 and the heat sink 42 are arranged along the +Y direction.

Other configurations of the head unit 2 are the same as those in the embodiments described above, and thus duplicate descriptions thereof will be omitted.

In such a head unit 2 of the present embodiment, by disposing the flow passage coupling portion 12 close to the intake port 53, the heat of the circuit substrate 40 is hardly conducted to the flow passage coupling portion 12, and the ink in the flow passage coupling portion 12 is hardly heated, as compared with a configuration in which the flow passage coupling portion 12 is disposed close to the exhaust port. As such, since the ink in the flow passage coupling portion 12 is hardly heated by the circuit substrate 40, it is possible to prevent the decrease in the viscosity of the ink supplied from the flow passage coupling portion 12 to the liquid ejecting head 100, to prevent the deterioration of ejection characteristics of the ink ejected from the liquid ejecting head 100, and to prevent occurrence of ejection defects of the ink.

Fourth Embodiment

Figure 10:
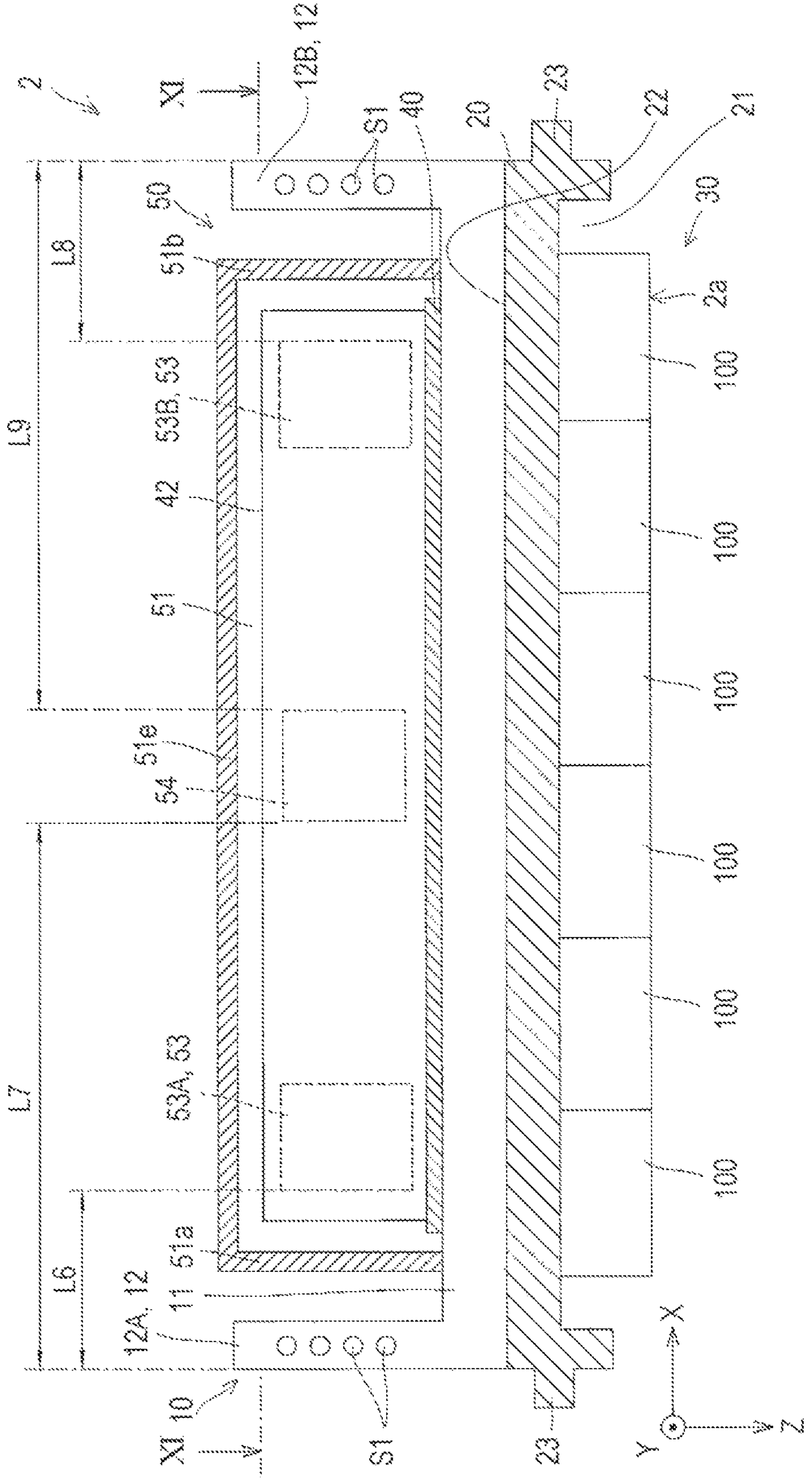
FIG. 10 is a sectional view of a main portion of a head unit according to a fourth embodiment.
Figure 11:
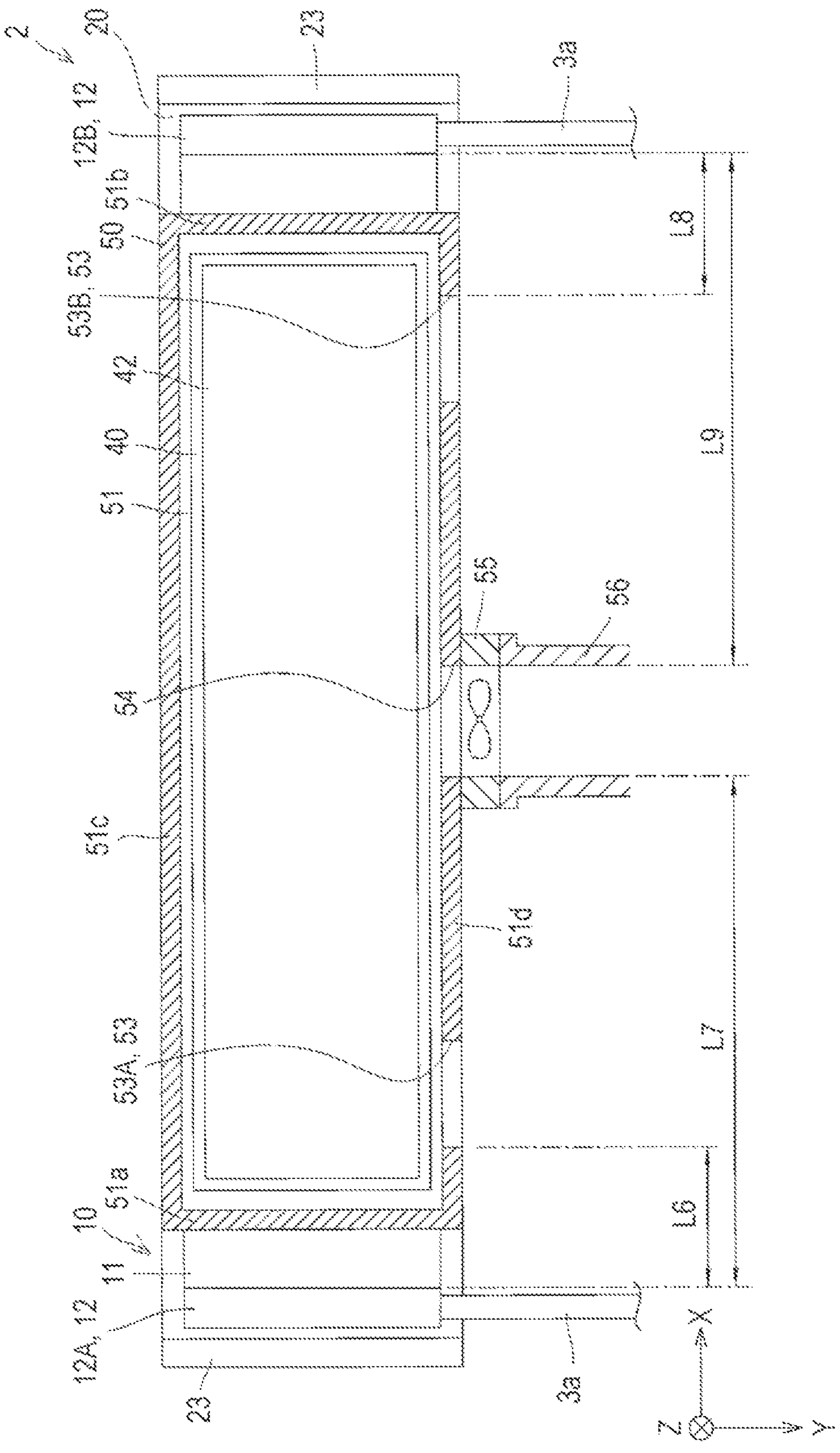
FIG. 11 is a sectional view of a main portion of the head unit according to the fourth embodiment.

FIG. 10 is a sectional view of a main portion of a head unit 2 according to a fourth embodiment of the present disclosure. FIG. 11 is a sectional view of the main portion taken along line XI-XI in FIG. 10. The same reference numerals will be given to the same members as in the embodiment in the drawings, and a redundant description thereof will be omitted.

Figure 12:
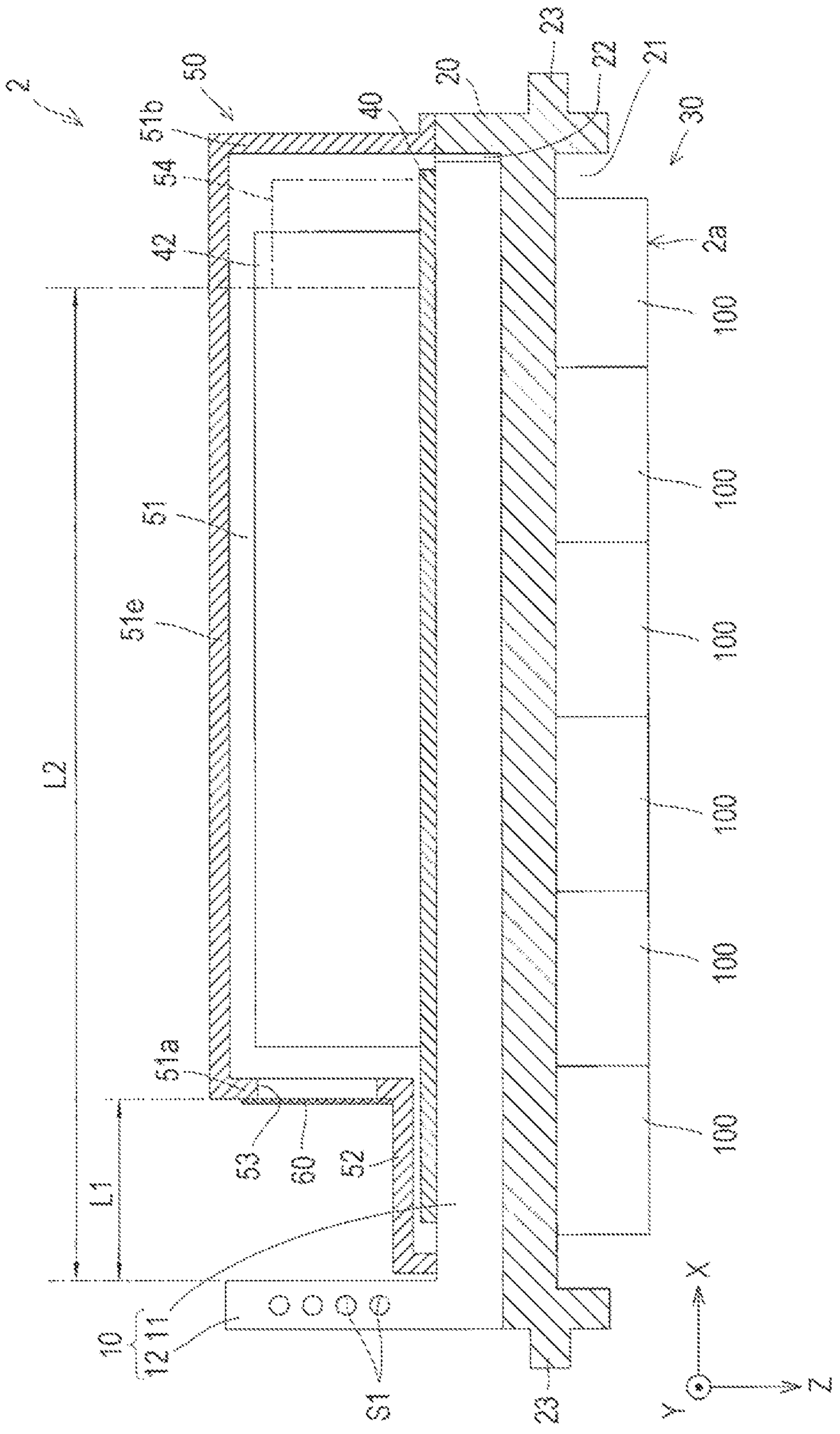
FIG. 12 is a sectional view of a main portion of a head unit according to a fifth embodiment.

As illustrated in FIGS. 11 and 12, the flow passage member 10 constituting the head unit 2 of the present embodiment includes a flow passage member main body 11 and two flow passage coupling portions 12. The two flow passage coupling portions 12 are provided on end portions of the flow passage member main body 11 in the −X direction and the +X direction, respectively. In the present embodiment, one flow passage coupling portion 12 provided in the −X direction is referred to as a first flow passage coupling portion 12A, and the other flow passage coupling portion 12 provided in the +X direction is referred to as a second flow passage coupling portion 12B. Hereinafter, the first flow passage coupling portion 12A and the second flow passage coupling portion 12B are collectively referred to as the flow passage coupling portion 12, unless otherwise distinguished. A plurality of first introduction ports S1 are provided on each of side surfaces of the flow passage coupling portion 12 in the +Y direction. In the present embodiment, four first introduction ports S1 are provided in each of the flow passage coupling portions 12, that is, a total of eight first introduction portions S1 are provided. Of course, the number of the first introduction ports S1 are not limited thereto, and when four first introduction ports S1 are provided as in the first embodiment, two first introduction ports S1 may be provided in each of two flow passage coupling portion 12, or the different number of the first introduction ports S1 may be provided in each of the two flow passage coupling portion 12. The first introduction port S1 may be provided in one flow passage coupling portion 12, and a discharge port of the recovery flow passage may be provided in the other flow passage coupling portion 12 in order to discharge the ink, which has not been ejected from the liquid ejecting head 100, to the outside of the head unit 2. In addition, the first flow passage coupling portion 12A is disposed in the −X direction from the first wall portion 51*a* at an interval with the first wall portion 51*a*. In addition, the second flow passage coupling portion 12B is disposed in the +X direction from the second wall portion 51*b* at an interval with the second wall portion 51*b*.

The cover 50 is provided with two intake ports 53 and one exhaust port 54. The intake ports 53 are provided in the end portions of the fourth wall portion 51*d* on the +X direction side and −X direction side, respectively. In the present embodiment, one intake port 53 provided in the −X direction is referred to as a first intake port 53A, and the other intake port 53 provided in the +X direction is referred to as a second intake port 53B. Hereinafter, the first intake port 53A and the second intake port 53B are collectively referred to as the intake port 53, unless otherwise distinguished. The flow passage coupling portion 12 is disposed closer to the intake port 53 than to the exhaust port 54. That is, the first flow passage coupling portion 12A is disposed closer to the first intake port 53A than to the exhaust port 54. A distance L6 between the first flow passage coupling portion 12A and the first intake port 53A is shorter than a distance L7 between the first flow passage coupling portion 12A and the exhaust port 54 in the direction along the X axis. That is, the distance L6 and the distance L7 satisfy a relationship of L6<L7. Further, the second flow passage coupling portion 12B is disposed closer to the second intake port 53B than to the exhaust port 54. A distance L8 between the second flow passage coupling portion 12B and the second intake port 53B is shorter than a distance L9 between the second flow passage coupling portion 12B and the exhaust port 54 in the direction along the X axis. That is, the distance L8 and the distance L9 satisfy a relationship of L8<L9. That is, each of the two flow passage coupling portions 12 are disposed closer to any one of two intake ports 53 than to the exhaust port 54.

Other configurations of the head unit 2 are the same as those in the embodiments described above, and thus duplicate descriptions thereof will be omitted.

In such a head unit 2 of the present embodiment, by disposing the flow passage coupling portion 12 close to the intake port 53, the heat of the circuit substrate 40 is hardly conducted to the flow passage coupling portion 12, and the ink in the flow passage coupling portion 12 is hardly heated, as compared with a configuration in which the flow passage coupling portion 12 is disposed close to the exhaust port. As such, since the ink in the flow passage coupling portion 12 is hardly heated by the circuit substrate 40, it is possible to prevent the decrease in the viscosity of the ink supplied from the flow passage coupling portion 12 to the liquid ejecting head 100, to prevent the deterioration of ejection characteristics of the ink ejected from the liquid ejecting head 100, and to prevent occurrence of ejection defects of the ink.

Fifth Embodiment

FIG. 12 is a sectional view of a main portion of a head unit 2 according to a fifth embodiment of the present disclosure. The same reference numerals will be given to the same members as in the embodiment in the drawings, and a redundant description thereof will be omitted.

As illustrated in FIG. 12, the same intake port 53 and exhaust port 54 described in the first embodiment are provided in the cover 50 of the head unit 2 in the present embodiment.

A filter 60 is provided on the first wall portion 51*a* where the intake port 53 of the cover 50 is opened. When the air is sucked from the intake port 53, the filter 60 captures foreign matters such as mist generated by ejection of the ink or paper dust and dust generated during transport of the medium S to prevent the foreign matters from being sucked into the second accommodating portion 51. As such a filter 60, for example, a sheet-like filter with a plurality of micropores formed by finely weaving a metal, a single plate-like member such as a metal plate or a resin plate formed with a plurality of through-holes, non-woven fabric, or the like can be used. In the present embodiment, the filter 60 is provided so as to have a size to cover the entire opening of the intake port 53. Instead of the filter 60, a gas-liquid separation membrane that allows gas to pass therethrough but does not allow the liquid to pass therethrough may be provided on the first wall portion 51*a* where the intake port 53 of the cover 50 is opened. Even with this configuration, it is possible to prevent mist and the like from being sucked into the second accommodating portion 51.

Other configurations of the head unit 2 are the same as those in the embodiments described above, and thus duplicate descriptions thereof will be omitted.

As described above, in the head unit 2 of the present embodiment, the cover 50 includes the filter 60 provided on the intake port 53. By providing the filter 60 on the intake port 53 as such, it is possible to prevent the foreign matters such as mist of the ink or paper dust from entering into the second accommodating portion 51 from the intake port 53. Therefore, the foreign matters adhere to the circuit substrate 40, such that it is possible to prevent short circuit of electronic components or wiring, and it is possible to deteriorate a cooling effect of the heat sink 42 due to the foreign matter. Further, the flow passage coupling portion 12 is provided at a position facing the intake port 53. Therefore, by providing the filter 60, the filter 60 can capture the ink leaked when the tube 3*a* is attached to and detached from the flow passage coupling portion 12 and prevent the ink from entering into the second accommodating portion 51 from the intake port 53.

Figure 13:
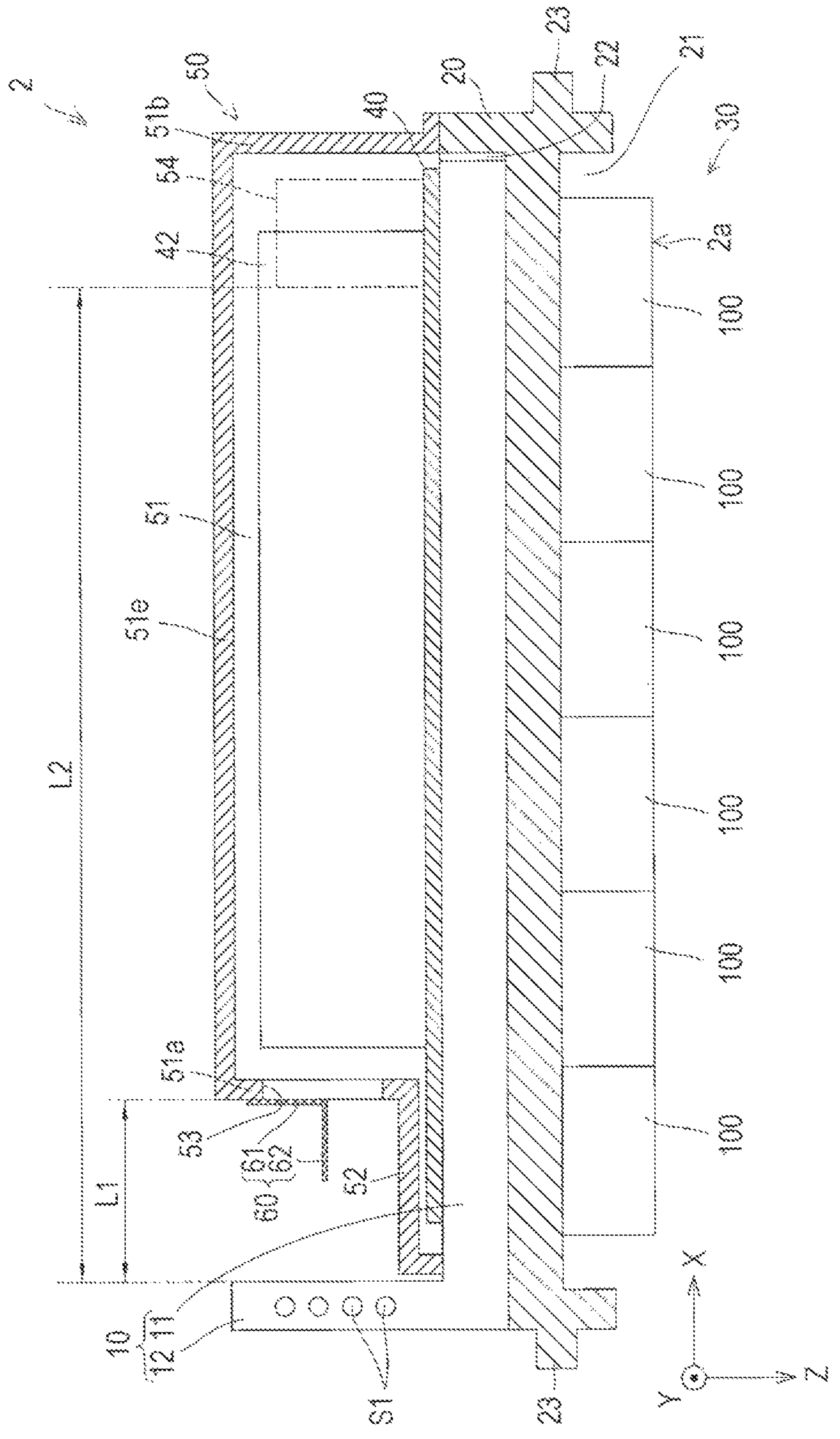
FIG. 13 is a sectional view of a main portion of a modification of the head unit according to the fifth embodiment.

FIG. 13 is a diagram illustrating a modification of a head unit 2 according to the fifth embodiment of the present disclosure. As illustrated in FIG. 13, the filter 60 includes a first part 61 covering the intake port 53 on the −Z direction side, and a second part 62 bent at 90 degrees to the first part and protruding like eaves in the −X direction.

In the ink jet recording apparatus 1, when the medium S is transported to the head unit 2 on the −Z direction side, the foreign matters such as paper dust and dust generated during transportation of the medium S fall on the head unit 2 from the −Z direction. Therefore, the second part 62 of the filter 60 is provided on the filter 60, such that the second part 62 can receive the foreign matters. Further, the first part 61 is provided on the filter 60, such that the first part 61 can catch the foreign matters so as not to suck the foreign matters received by the second part 62 into the second accommodating portion 51 from the intake port 53.

Accordingly, it is possible to efficiently prevent the foreign matters from entering into second accommodating portion 51 from the intake port 53.

The filter 60 does not cover the intake port 53 on the +Z direction side. Therefore, the filter 60 can prevent reduction of a suction force of the air sucked from the intake port 53 and efficiently cool the inside of the second accommodating portion 51 by the air.

The filter 60 may be attached to and detached from the cover 50. Accordingly, the filter 60 can be easily replaced, and maintenance can be improved.

Further, a mechanism for removing the foreign matters adhering to the filter 60 may be provided. For example, a wiping mechanism wiping the filter 60 may be provided. Further, by providing a mechanism for periodically sending out the filter 60 wound in a roll shape, the intake port 53 may be covered with a region of the filter 60 to which the foreign matters do not adhere. Such a mechanism is provided, the filter 60 can thus be used for a long period of time, and the maintenance can be improved because it is not required to frequently replace the filter 60. As a drive source such as the mechanism wiping the filter 60 or the sending-out mechanism, a drive source or the like provided in the ink jet recording apparatus 1 for moving the head unit 2 along the Z axis can be used, thereby reducing costs. Of course, when the intake port 53 communicates with the outside of the ink jet recording apparatus 1 through a suction duct, the filter 60 can capture dust and the like outside the ink jet recording apparatus 1. In addition, when the intake port 53 communicates with the outside of the ink jet recording apparatus 1 through the suction duct, the filter 60 may be provided in the middle of an intake duct, on an outer surface of the ink jet recording apparatus 1, or the like.

Other Embodiments

As described above, the embodiments of the present disclosure have been described, but the basic configurations of the present disclosure are not limited to the embodiments described above.

For example, in the embodiments described above, the first introduction port S1 is opened on the side surface of the flow passage coupling portion 12 in the +Y direction. However, the present embodiment is not limited thereto, and the first introduction port S1 may be opened on a surface of the flow passage coupling portion 12 in the −Z direction. Of course, the first introduction port S1 may be provided on a surface of the flow passage coupling portion 12 in the −Y direction or a surface of the flow passage coupling portion 12 in the −X direction.

The ink jet recording apparatus 1 in the embodiments described above is a line recording apparatus that performs printing in a state in which the head unit 2 is fixed to the apparatus main body 6. However, the ink jet recording apparatus 1 is not particularly limited thereto, and may be a so-called serial recording apparatus that performs printing while the head unit 2 moves in a direction intersecting the +Y direction, which is a transport direction of the medium S, for example, in the +X direction and the −X direction.

In the embodiments described above, the circuit substrate 40 is provided with the heat sink 42, but is not particularly limited thereto, and may not be provided with the heat sink 42. That is, the circuit substrate 40 may be accommodated in the second accommodating portion 51 and directly cooled by the air. Further, the circuit substrate 40 may include a plurality of substrates. For example, the circuit substrate 40 may have a substrate provided with the drive signal generation circuit and a relay substrate relaying the coupling between the substrate and coupling wiring or external wiring. Of course, the circuit substrate 40 may have a plurality of substrates stacked along the Z axis, or may be divided into two or more substrates along the +X direction.

In the embodiments described above, the configuration has been described in which the intake port 53 sucks the air inside the ink jet recording apparatus 1. However, the present embodiment is not limited thereto, and the intake port 53 may suck the air outside the ink jet recording apparatus 1 into the second accommodating portion 51 through the suction duct, by opening the other end of the intake duct whose one end is coupled to the intake port 53 to the outside of the ink jet recording apparatus 1, that is, to the outer surface of the apparatus main body 6.

Furthermore, the present disclosure is intended for a wide range of the head unit. For example, the present disclosure can be also applied to head units using recording heads such as various ink jet recording heads used in image recording apparatuses such as printers, coloring material ejecting heads used in manufacturing color filters for liquid crystal displays, and the like, electrode material ejecting heads used for electrode formation such as organic electroluminescent (EL) displays, field emission displays (FEDs), bio-organic matter ejecting heads used in biochip manufacturing, and the like. Although the ink jet recording apparatus 1 has been described as an example of the liquid ejecting apparatus, a liquid ejecting apparatus with the head unit using other liquid ejecting heads described above can be also used.

What is claimed is:

1. A head unit configured to eject a liquid, comprising:
a circuit substrate for driving the head unit;
a casing including a cover for defining an accommodation space that accommodates the circuit substrate; and
a flow passage member of which a part is disposed in the casing, including a flow passage coupling portion for coupling to a flow passage member outside the head unit, wherein
the cover has an intake port for sucking air from an outside of the cover to the accommodation space and an exhaust port for exhausting the air passing through the accommodation space, and
the flow passage coupling portion is disposed outside the casing and disposed closer to the intake port than to the exhaust port.

2. The head unit according to claim 1, wherein
the intake port faces the flow passage coupling portion.

3. The head unit according to claim 2, wherein
a distance between the intake port and the flow passage coupling portion is equal to or more than a maximum width of the intake port.

4. The head unit according to claim 2, wherein
an opening of a flow passage formed in the flow passage coupling portion does not face the intake port.

5. The head unit according to claim 1, wherein
the exhaust port does not face the flow passage coupling portion.

6. The head unit according to claim 1, wherein
the air sucked from the intake port moves in a first direction from the intake port to the exhaust port, and
the flow passage coupling portion, the intake port, and the exhaust port are sequentially arranged in the first direction.

7. The head unit according to claim 6, wherein
a longitudinal direction of the circuit substrate is the first direction,
the intake port is located in one end side of a space from the intake port to the exhaust port regarding the first direction in the accommodation space, and
the exhaust port is located in another end side of the space regarding the first direction.

8. The head unit according to claim 7, wherein
the exhaust port exhausts the air in a second direction different from the first direction.

9. The head unit according to claim 7, wherein
the head unit is a line head in which liquid ejecting heads are arranged in the first direction, and
the circuit substrate is a circuit substrate common to the liquid ejecting heads.

10. The head unit according to claim 9, wherein
the head unit has an ejection surface on which nozzles configured to eject the liquid are formed, and
the flow passage coupling portion overlaps with the accommodation space with respect to a direction perpendicular to the ejection surface.

11. The head unit according to claim 10, wherein
a thickness direction of the circuit substrate is the same as the direction perpendicular to the ejection surface.

12. The head unit according to claim 11, further comprising:

a heat sink for dissipating heat of the circuit substrate, disposed in the accommodation space, wherein a part of the flow passage member is disposed in the accommodation space, and the circuit substrate is disposed between the part of the flow passage member disposed in the accommodation space and the heat sink.

13. The head unit according to claim 1, wherein the cover includes a filter provided on the intake port.

14. The head unit according to claim 1, wherein the air is introduced from the outside of the cover through the intake port by an air blowing mechanism.

15. A liquid ejecting apparatus comprising:

the head unit according to claim 1; and a liquid storage portion storing the liquid supplied to the head unit.

* * * * *